US 6,716,277 B2

(12) United States Patent
Naruse et al.

(10) Patent No.: US 6,716,277 B2
(45) Date of Patent: *Apr. 6, 2004

(54) INK FOR INK JET AND INK JET RECORDING METHOD

(75) Inventors: Hideaki Naruse, Minami-Ashigara (JP); Tadashi Omatsu, Minami-Ashigara (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/861,635

(22) Filed: May 22, 2001

(65) Prior Publication Data

US 2002/0112641 A1 Aug. 22, 2002

(30) Foreign Application Priority Data

May 23, 2000 (JP) ........................................ 2000-151105

(51) Int. Cl.⁷ ............................................... C09D 11/02
(52) U.S. Cl. ................................. 106/31.27; 106/31.43; 106/31.47; 106/31.49; 106/31.58
(58) Field of Search ........................... 106/31.27, 31.58, 106/31.43, 31.47, 31.49

(56) References Cited

U.S. PATENT DOCUMENTS

| | | | |
|---|---|---|---|
| 4,246,154 A | | 1/1981 | Yao |
| 4,409,039 A | * | 10/1983 | Lepesant et al. ......... 106/31.25 |
| 4,597,794 A | | 7/1986 | Ohta et al. |
| 4,665,411 A | | 5/1987 | Kiritani et al. |
| 5,344,933 A | | 9/1994 | Mikoshiba et al. |
| 5,753,017 A | * | 5/1998 | Onodera et al. ......... 106/31.49 |
| 6,020,400 A | | 2/2000 | Anton et al. |
| 6,031,019 A | | 2/2000 | Tsutsumi et al. |
| 6,344,497 B1 | | 2/2002 | Meyrick et al. |
| 6,383,276 B1 | * | 5/2002 | Yamakawa et al. ...... 106/31.49 |
| 2001/0045176 A1 | * | 11/2001 | Kimura et al. ............ 106/31.47 |
| 2002/0007762 A1 | * | 1/2002 | Arakawa .................. 106/31.27 |
| 2002/0017217 A1 | * | 2/2002 | Mizukawa et al. ....... 106/31.47 |
| 2002/0067399 A1 | * | 6/2002 | Yabuki et al. ............. 347/100 |

FOREIGN PATENT DOCUMENTS

| | | |
|---|---|---|
| JP | 56-157468 | 4/1981 |
| JP | 58-45272 | 3/1983 |
| JP | 62-207375 | 11/1987 |
| JP | 01-170674 | 5/1989 |
| JP | 01-170674 A1 * | 7/1989 |
| JP | 03-103484 A | 4/1991 |
| JP | 4-18468 | 1/1992 |
| JP | 04-039365 A | 2/1992 |
| JP | 06-340835 A | 12/1994 |
| JP | 07-268254 A | 10/1995 |
| JP | 07-268257 A | 10/1995 |
| JP | 07-268260 A | 10/1995 |
| JP | 08-286340 | 1/1996 |
| JP | 08-183920 A | 7/1996 |
| JP | 08-269374 A | 10/1996 |
| JP | 10-110126 | 4/1998 |
| JP | 10-195355 | 7/1998 |
| JP | 10-279873 | 10/1998 |
| JP | 11-286637 A | 10/1999 |
| JP | 2000-303009 A | 10/2000 |
| JP | 2000-327939 A | 11/2000 |

* cited by examiner

Primary Examiner—Helene Klemanski
(74) Attorney, Agent, or Firm—Burns, Doane, Swecker & Mathis, L.L.P.

(57) ABSTRACT

An ink for an ink jet, the ink being formed by dispersing in a water-based medium an oil-soluble dye that is dissolved in a high boiling point organic solvent, with the ink containing a compound having in a molecule at least one carbon-carbon unsaturated bond that is different from a phenyl group. Further, an ink jet recording method, the method comprising recording on an image receiving material having an image receiving layer including white inorganic pigment particles on a support, the method using an ink for an ink jet, with the ink being formed by dispersing in a water-based medium an oil-soluble dye that is dissolved in a high boiling point organic solvent, and the ink containing a compound having in a molecule at least one carbon-carbon unsaturated bond that is different from a phenyl group.

17 Claims, No Drawings

INK FOR INK JET AND INK JET RECORDING METHOD

BACKGROUND OF THE INVENTION

1. Field of the Invention

The present invention relates to an ink for an ink jet, which has excellent image quality, water resistance and image fastness, and to an ink jet recording method using the ink.

2. Description of the Related Art

In recent years, with the spread of computers, ink jet printers are being widely used for printing paper, film, cloth or the like, not only in offices but also in homes. As inks for ink jets, oil-based, water-based and solid inks are known, and water-based inks are mainly used from the standpoints of production, handling property, odor, safety and the like.

Since most water-based inks use water-soluble dyes which dissolve in a molecular state, on the one hand they have an advantage in that they show high transparency and color density, and on the other hand they have a disadvantage in that they show poor water resistance and thereby cause bleeding when so-called plain papers are printed using these inks, which results in considerably low printing quality. They have a further disadvantage in that they show considerably poor light resistance.

In order to overcome the above drawbacks, various water-based inks using pigments or disperse dyes are suggested, for example, in Japanese Patent Application Laid-Open (JP-A) Nos. 56-157468, 4-18468, 10-110126 and 10-195355. In the water-based inks disclosed in these applications, water resistance is improved, but not perfectly, and there are still disadvantages, for example, in that the pigment inks in particular show poor color development as compared with the dye inks, and in that these water-based inks easily cause clogging at ink discharge ports because of insufficient preservation stability of dispersed materials.

JP-A No. 58-45272 suggests a method of containing a dye in urethane polymer latex particles. However, this method has a disadvantage in that, when the dye is contained at a desired concentration, color particles having excellent dispersion stability are difficult to obtain. Further, JP-A No. 10-279873 discloses a method of producing color polymer fine particles by dissolving an acrylic polymer and an oil-soluble dye in an organic solvent and by removing the organic solvent after dispersion. However, this method has problems in recorded image quality, particularly in quality when the image is recorded on a photo quality paper medium, and in stability in continuous recording.

Japanese Patent Application Publication (JP-B) No. 5-76977 discloses an ink composition in which an oil-soluble dye is dissolved and dispersed in an organic solvent. However, the specified organic solvent therein generally has a low recording density because of insufficient compatibility with the oil-soluble dye, and thus, it is obvious that the dye may be deposited during preservation and that this results in clogging at nozzles.

Further, the disclosed oil-soluble dye has insufficient color reproducibility because of insufficient color tone, and also has insufficient preservation stability of obtained images.

In order to improve the preservation stability, JP-A No. 1-170674 discloses a recording solution for an ink jet which contains an ultraviolet light absorber and/or an antioxidant. However, the obtained image quality is not sufficient.

In order to prevent deposition of the dye and to secure discharge stability and obtain higher recorded image quality, average particle size of the color particles needs to be decreased, while image preservability requires to be further improved under this condition.

SUMMARY OF THE INVENTION

An object of the present invention is to provide an ink for an ink jet, which has excellent image quality, water resistance and image fastness; and an ink jet recording method using the ink.

The above object is attained by the following means:

A first aspect of the present invention is an ink for an ink jet, the ink being formed by dispersing in a water-based medium an oil-soluble dye that is dissolved in a high boiling point organic solvent, with the ink containing a compound having in a molecule at least one carbon-carbon unsaturated bond that is different from a phenyl group.

A second aspect of the present invention is an ink jet recording method, the method comprising recording on an image receiving material having an image receiving layer including white inorganic pigment particles on a support, the method using an ink for an ink jet, with the ink being formed by dispersing in a water-based medium an oil-soluble dye that is dissolved in a high boiling point organic solvent, and the ink containing a compound having in a molecule at least one carbon-carbon unsaturated bond that is different from a phenyl group.

DESCRIPTION OF THE PREFERRED EMBODIMENTS

Hereinafter, an ink for an ink jet and an ink jet recording method of the present invention will be described.

[Ink for Ink Jet]

An ink for an ink jet of the present invention is formed by dispersing in a water-based medium an oil-soluble dye that is dissolved in a high boiling point organic solvent. The ink contains a compound having in a molecule at least one carbon-carbon unsaturated bond that is different from a phenyl group. Hereinafter, this compound is referred to as a "carbon-carbon unsaturated bond containing compound".

The ink for the ink jet of the present invention is in a state in which the oil-soluble dye and the high boiling point organic solvent are dispersed in the water-based medium as oil droplets having a fine-particle shape (hereinafter, these oil droplets are referred to as "dispersed particles"), which state is known as an emulsification dispersion state. The "water-based medium" used in the present invention means the one which is formed by adding additives such as a surfactant, a wetting agent, a stabilizer, an antiseptic and the like, as required, to water or a mixture of water and a small amount of water-miscible organic solvent.

As the oil-soluble dye used in the present invention, dyes having any degree of solubility in water can be used.

Carbon-Carbon Unsaturated Bond Containing Compound

When the carbon-carbon unsaturated bond containing compound has a geometrical isomer (for example, a cis-trans isomer), the compound may be a single component or a mixture. The carbon-carbon unsaturated bond containing compound used in the present invention is preferably at least one of the compounds represented by the following general formulae (A) to (H).

General formula (A)

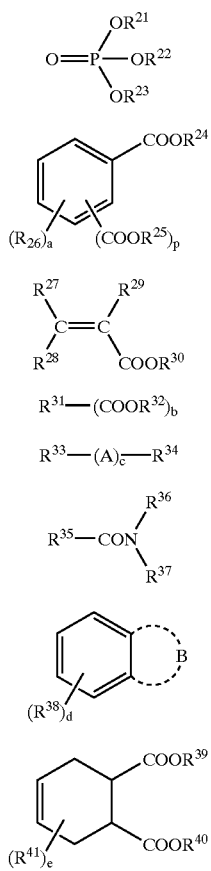

General formula (B)

General formula (C)

General formula (D)

General formula (E)

General formula (F)

General formula (G)

General formula (H)

In the general formulae (A) to (H), $R^{21}$, $R^{24}$, $R^{32}$ and $R^{33}$ each independently represents an alkenyl group or an alkynyl group having 2 to 40 carbon atoms, preferably represents an alkenyl group having 2 to 40 carbon atoms, and more preferably represents one of the following alkenyl groups a) to v).

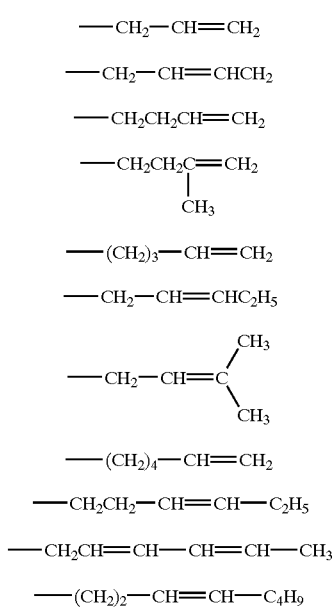

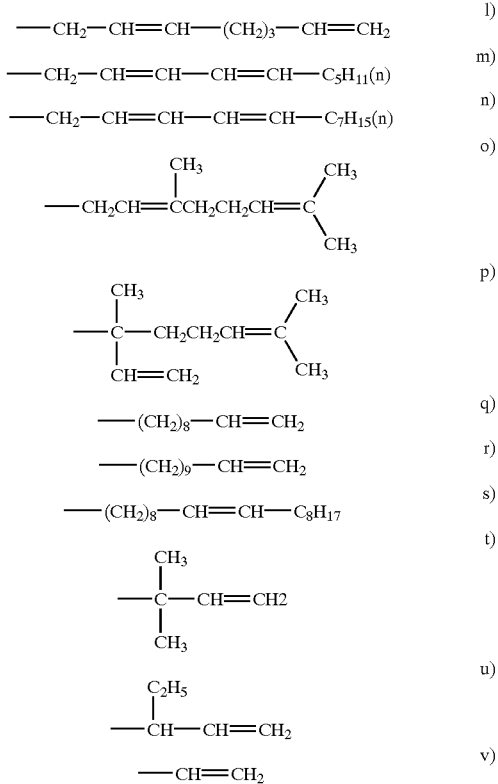

In the general formulae (A) to (H), $R^{22}$, $R^{23}$, $R^{25}$, $R^{27}$, $R^{28}$, $R^{29}$, $R^{30}$, $R^{34}$, $R^{35}$, $R^{36}$, $R^{37}$, $R^{39}$ and $R^{40}$ each independently represents a hydrogen atom, an aliphatic group having 1 to 40 carbon atoms (for example, methyl, ethyl, i-propyl, t-butyl, cyclopentyl, cyclohexyl, benzyl, chloromethyl, trifluoromethyl, butoxyethyl, allyl, vinyl, oleyl, 3-methyl-3-butenyl, 2,7-octadienyl, 2-ethylhexyl, octyl, i-decyl, 3,5,5-trimethylhexyl, i-tridecyl, dodecyl, and 2-hexyldecyl), an aryl group having 6 to 40 carbon atoms (for example, phenyl, 2-naphthyl, 4-methoxyphenyl, 3-methylphenyl, and 2-chlorophenyl), or a heterocyclic group having 1 to 40 carbon atoms (for example, pyrrolidyl, piperidyl, pyridyl, tetrazolyl and imidazolyl); preferably represents a hydrogen atom, an aliphatic group or an aryl group; and more preferably represents a hydrogen atom or an aliphatic group. $R^{22}$, $R^{23}$, $R^{25}$, $R^{34}$ and $R^{35}$ each still more preferably represents an alkenyl group or an alkynyl group, and particularly preferably represents an alkenyl group. More preferable alkenyl group is the same ones as above-mentioned for $R^{21}$, $R^{24}$, $R^{32}$ and $R^{33}$. Further, at least one of $R^{35}$, $R^{36}$ and $R^{37}$ represents an alkenyl group or an alkynyl group having 2 to 40 carbon atoms.

$R^{26}$, $R^{38}$ and $R^{41}$ each represents a substituent; preferably represents an aliphatic group having 1 to 30 carbon atoms (preferable examples thereof are the same ones as above-mentioned for $R^{22}$ etc.), an aryl group having 6 to 36 carbon atoms (preferable examples thereof are the same ones as above-mentioned for $R^{22}$ etc.), an alkoxy group having 1 to 30 carbon atoms (for example, methoxy and 2-ethylhexyloxy), an aryloxy group having 6 to 36 carbon atoms (for example, phenoxy), a halogen atom (for example, fluorine, chlorine and bromine), a cyano group, a carbamoyl group having 1 to 30 carbon atoms (for example, N,N-dibutylcarbamoyl and N-octylcarbamoyl), an acylamino group having 1 to 30 carbon atoms (for example, acetoamino and benzoylamino), an acyloxy group (for example, acetyloxy and benzoyloxy), or an aliphatic oxycarbonyl group (for example, methoxycarbonyl and allyloxycarbonyl); and more preferably represents an aliphatic group, an aryl group, an alkoxy group, a halogen atom, a carbamoyl group, an acylamino group, an acyloxy group or an aliphatic oxycarbonyl group.

In the general formula (A), $R^{21}$, $R^{22}$ and $R^{23}$ each preferably represents an alkenyl group or an alkenyl group having 2 to 30 carbon atoms, and more preferably represents an alkenyl group having 3 to 20 carbon atoms. $R^{21}$, $R^{22}$ and $R^{23}$ are preferably the same, and the total number of the carbon atoms in $R^{21}$ to $R^{23}$ is preferably 15 to 54 and more preferably 18 to 33. $R^{21}$ and $R^{22}$, and $R^{21}$ and $R^{23}$ may respectively bond each other to form a ring. However, this is not preferable.

In the general formula (B), $R^{24}$ and $R^{25}$ each preferably represents an alkenyl group or an alkenyl group having 2 to 30 carbon atoms, and more preferably represents an alkenyl group having 3 to 11 carbon atoms. p represents 0 or 1. When p represents 1, —COOR$^{25}$ is preferably a para-position or an ortho-position of —COOR$^{24}$, and particularly preferably an ortho-position thereof. $R^{26}$ more preferably represents an aliphatic oxycarbonyl group, an alkoxy group, a halogen atom or a carbamoyl group; and still more preferably represents an aliphatic oxycarbonyl group. a represents an integer of 0 to 4, preferably represents an integer of 0 to 2, more preferably represents 0 or 1, and particularly preferably represents 0. When a represents 4, all $R^{26}$ preferably represents a halogen atom; and when a represents 1 or 2, $R^{26}$ preferably represents an aliphatic oxycarbonyl group. Further, when $R^{26}$ represents an allyloxycarbonyl group, a preferably represents 1 or 2 and more preferably represents 1, and at that time, $R^{24}$ and $R^{25}$ each preferably represents an allyl group. $R^{24}$ and $R^{25}$, $R^{24}$ and $R^{26}$, and $R^{26}$ and $R^{26}$ may respectively bond each other to form a ring. However, this is not preferable.

In the general formula (G), B represents a non-metallic atom group which together with a benzene ring can form an unsaturated ring. Examples of the ring formed by B and the benzene ring preferably include a naphthalene ring, an anthracene ring, a benzoisofuran ring, a dihydrobenzoisofuran ring, a benzoisothiophene ring, an indole ring and the like. $R^{38}$ preferably represents an aliphatic group, an aryl group, an aliphatic oxy group or an acyloxy group. d represents an integer of 0 to 4, and preferably an integer of 0 to 2. $R^{38}$ and $R^{38}$, and $R^{38}$ and B may respectively bond each other to form a ring. The total number of the carbon atoms in the compound represented by the general formula (G) is 10 to 60 and preferably 14 to 50.

In the general formula (H), $R^{39}$ and $R^{40}$ each preferably represents an aliphatic group, more preferably represents an alkyl group or an alkenyl group, and particularly preferably represents an alkenyl group. $R^{39}$ and $R^{40}$ are preferably the same. $R^{41}$ preferably represents an aliphatic group or a halogen atom, and more preferably represents a methyl group. e represents an integer of 0 to 6, preferably represents 0 or 2, and more preferably represents 0. $R^{39}$ and $R^{40}$, $R^{40}$ and $R^{41}$, and $R^{41}$ and $R^{41}$ may respectively bond each other to form a ring. Further, the total number of the carbon atoms in the compound represented by the general formula (H) is preferably 12 to 60, more preferably 14 to 50, and still more preferably 15 to 40.

Furthermore, the substituents ($R^{27}$, $R^{28}$, $R^{29}$, $R^{30}$, $R^{32}$, $R^{33}$, $R^{34}$, $R^{35}$, $R^{36}$ and $R^{37}$) in the above general formulae (C), (D), (E) and (F) are not particularly limited.

In the general formula (D), b represents an integer of 1 to 4. When b represents 1, $R^{31}$ represents an aliphatic group having 1 to 40 carbon atoms, an aryl group having 6 to 40 carbon atoms, or a heterocyclic group having 1 to 40 carbon atoms; and when b represents an integer of 2 to 4, $R^{31}$ represents an aliphatic group having 1 to 20 carbon atoms each having a valence of b.

In the general formula (E), A represents an oxygen atom or a sulfur atom, and c represents 0 or 1.

In the general formulae (A) to (H), when a, b, d and e each represents an integer of 2 or more, a plurality of $R^{26}$, —COOR$^{32}$, $R^{38}$ and $R^{41}$ may be the same or different from each other, respectively.

$R^{27}$ and $R^{28}$, $R^{27}$ and $R^{29}$, $R^{27}$ and $R^{30}$ and $R^{29}$ and $R^{30}$ in the general formula (C); $R^{31}$ and $R^{32}$, and $R^{32}$ and $R^{32}$ in the general formula (D); $R^{33}$ and $R^{34}$ in the general formula (E); and $R^{35}$ and $R^{36}$, and $R^{36}$ and $R^{37}$ in the general formula (F) may respectively bond each other to form a ring.

The carbon-carbon unsaturated bond containing compound used in the present invention is more preferably one of the compounds represented by the general formulae (A), (B), (C), (D), (E), (F) and (H), still more preferably one of the compounds represented by the general formulae (A), (B), (C), (D) and (H), and particularly preferably one of the compounds represented by the general formulae (A), (B) and (C).

These carbon-carbon unsaturated bond containing compounds are used 0.1 to 5 times, and preferably used 0.2 to 2 times by weight as much as the oil-soluble dye is used.

Further, these carbon-carbon unsaturated bond containing compounds can be synthesized in the method described in JP-A No. 8-44015.

Specific examples of the carbon-carbon unsaturated bond containing compound used in the present invention will be shown below. However, the present invention is not limited to these.

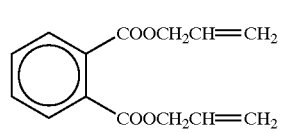

S-1

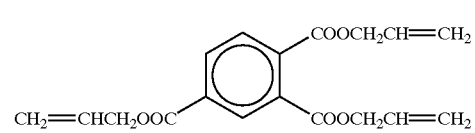

S-2

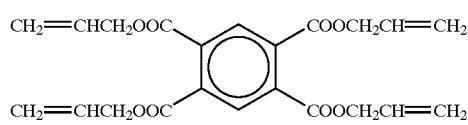

S-3

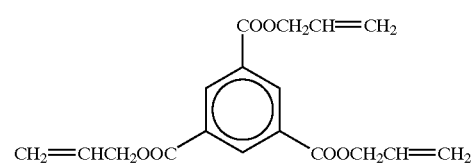

S-4

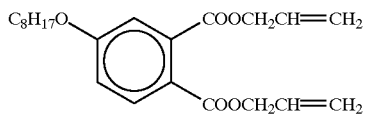
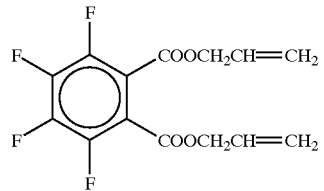
S-5
S-6
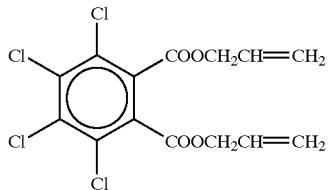
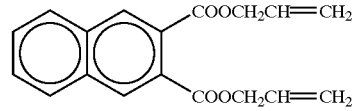
S-7
S-8
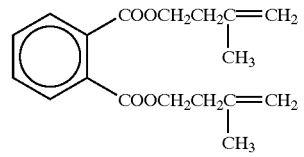
S-9
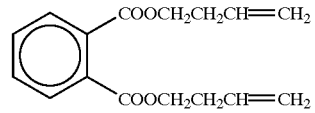
S-10
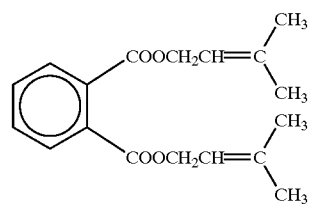
S-11
S-12
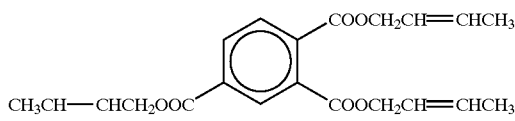
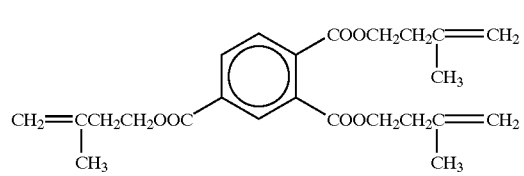
S-13
S-14
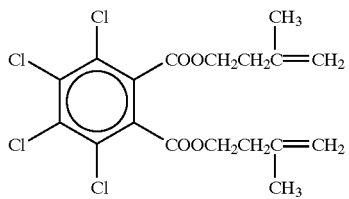
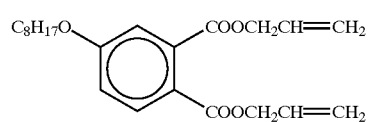
S-15
S-16
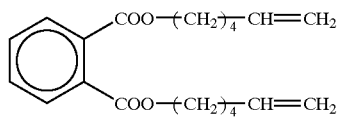
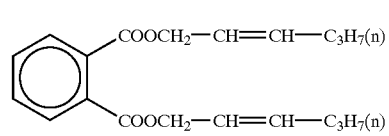
S-17
S-18
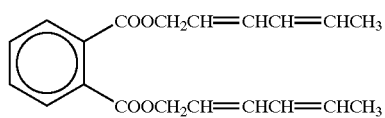
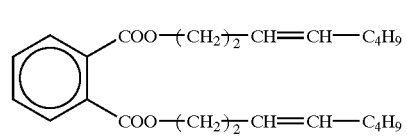
S-19
S-20
S-21
S-22

-continued

S-23: benzene-1,2-diyl bis(COOCH₂CH—CH=CH—(CH₂)₃—CH=CH₂)

S-24: benzene-1,2,4-triyl tris(COOCH₂CH—CH=CH—(CH₂)₃—CH=CH₂)

S-25: 4-methoxybenzene-1,2-diyl bis(COOCH₂CH—CH=CH—(CH₂)₃—CH=CH₂)

S-26: 3,4,5,6-tetrachlorobenzene-1,2-diyl bis(COOCH₂CH—CH=CH—(CH₂)₃—CH=CH₂)

S-27: 4-(C₇H₁₅CONH)benzene-1,2-diyl bis(COOCH₂CH=CH₂)

S-28: 4-(N(C₈H₁₇)₂)benzene-1,2-diyl bis(COOCH₂CH=CH₂)

S-29: benzene-1,2-diyl bis(COOCH₂CH—CH=CH—CH=CH—C₅H₁₁(n))

S-30: benzene-1,2-diyl bis(COOCH₂CH—CH=CH—CH=CH—C₇H₁₅(n))

S-31: benzene-1,2-diyl bis(COOCH₂CH=CCH₂CH₂CH=C(CH₃)₂ with CH₃)

S-32: benzene-1,2-diyl bis(COOCCH₂CH₂CH=C(CH₃)₂ branched with CH=CH₂ and CH₃)

S-33: benzene-1,2-diyl bis(COO—(CH₂)₈—CH=CH₂)

S-34: benzene-1,2-diyl bis(COO—(CH₂)₉—CH=CH₂)

S-35: benzene-1,2-diyl bis(COO—(CH₂)₈—CH=CH—C₈H₁₇)

S-36: benzene-1,2-diyl (COOC₈H₁₇)(COOCH₂CH=CH₂)

S-37: benzene-1,2-diyl (COO-cyclohexyl)(COOCH₂CH₂C(CH₃)=CH₂)

S-38: benzene-1,2-diyl (COO-phenyl)(COOCH₂CH=CH₂)

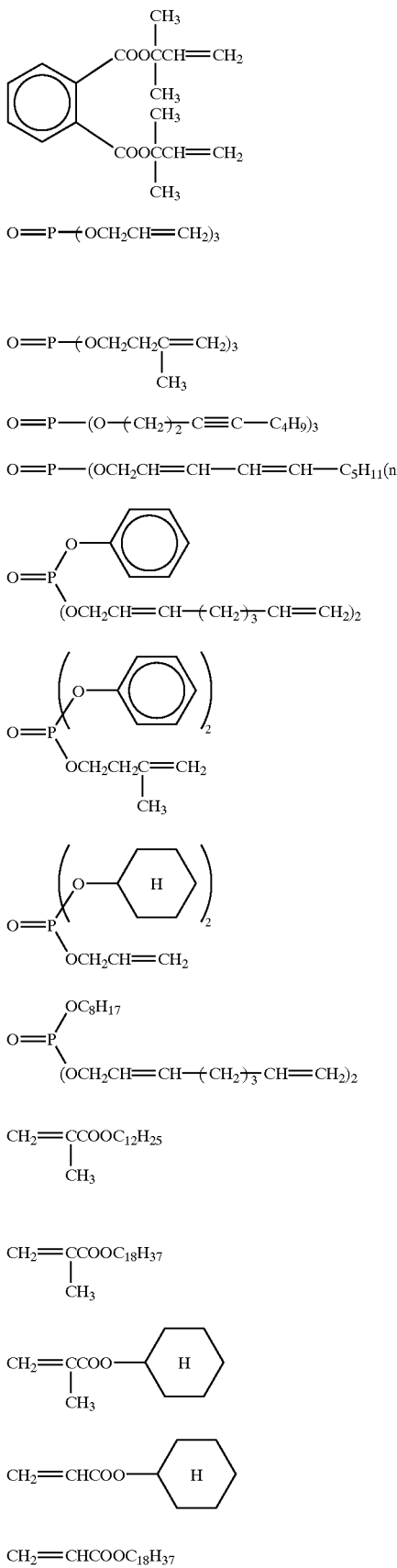
-continued
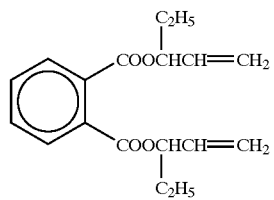
S-40
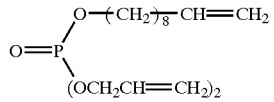
S-42
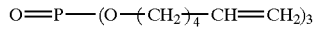
S-44
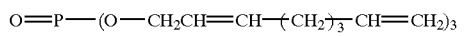
S-46
S-48
S-50
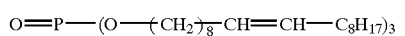
S-52
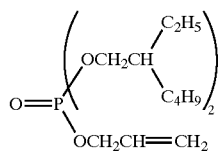
S-54
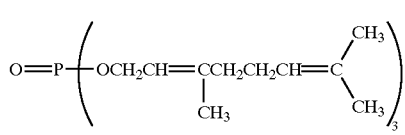
S-56
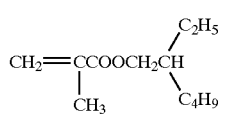
S-58
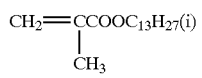
S-60
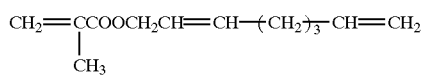
S-62
S-64
S-66

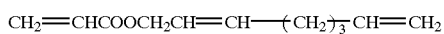 S-67
 S-68
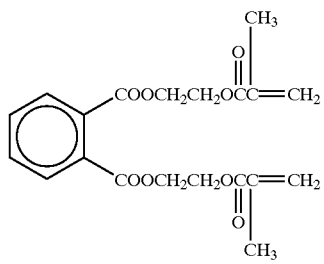 S-69
 S-70
 S-71
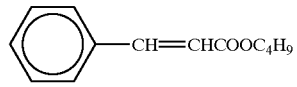 S-72
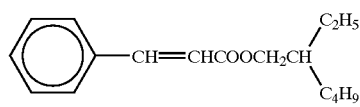 S-73
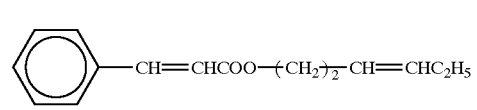 S-74
 S-75
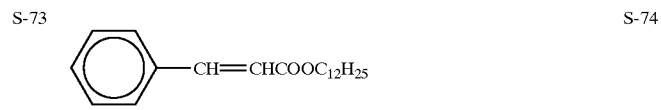 S-76
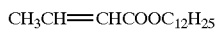 S-77
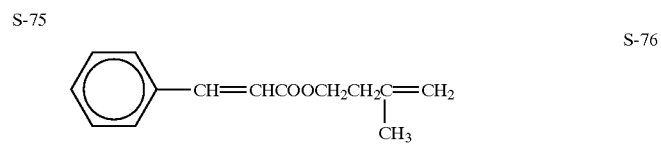 S-78
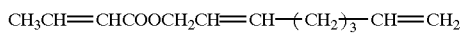 S-79
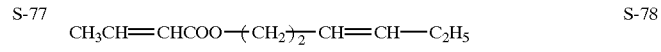 S-80
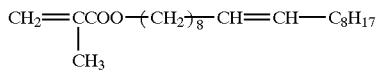 S-81
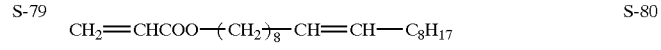 S-82
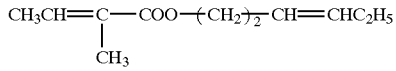 S-83
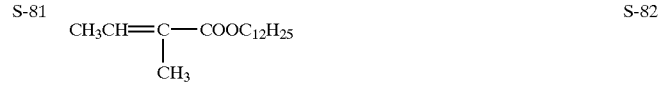 S-84
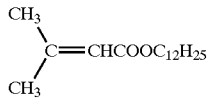 S-85
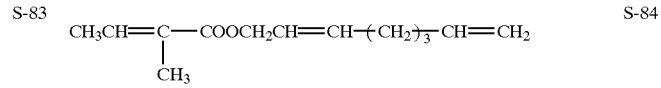 S-86
 S-87
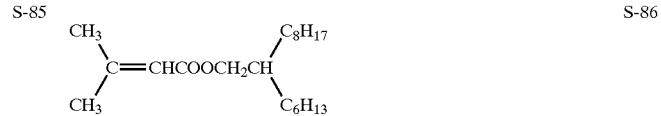 S-88
 S-89
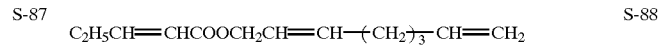 S-90
 S-91
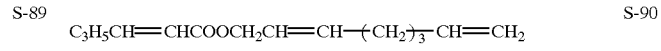 S-92
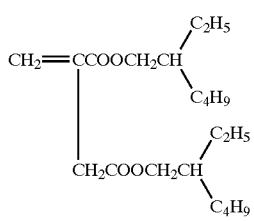 S-93
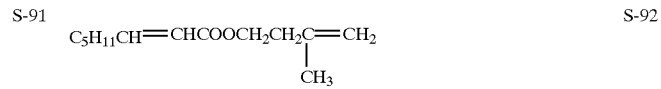 S-94
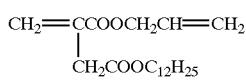 S-95
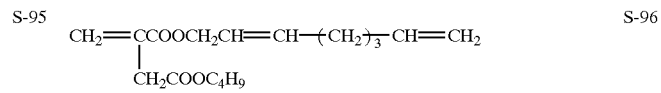 S-96

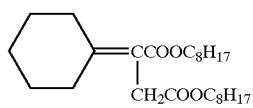
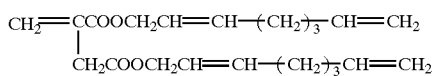
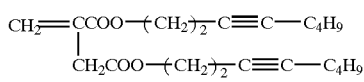
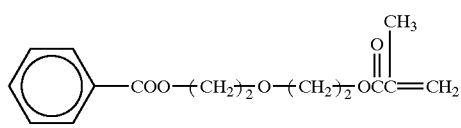
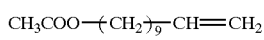
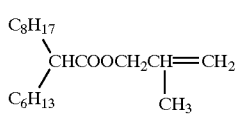
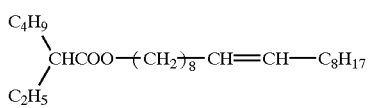
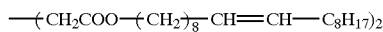
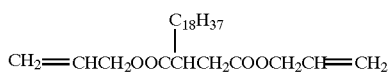
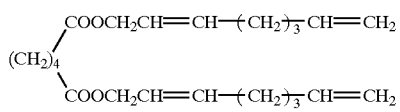
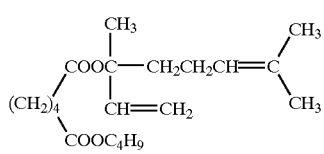
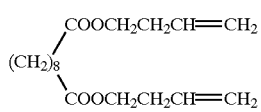
-continued
S-97
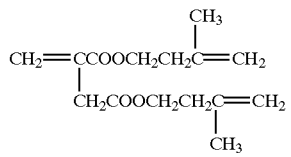
S-98
S-99
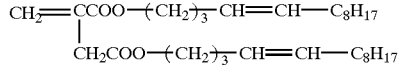
S-100
S-101
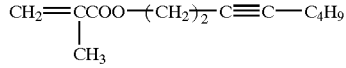
S-102
S-103
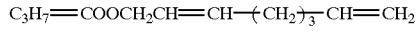
S-104
S-105
S-106
S-107
S-108
S-109
S-110
S-111
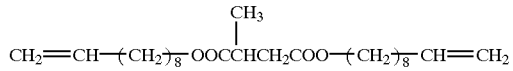
S-112
S-113
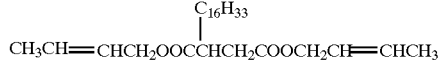
S-114
S-115
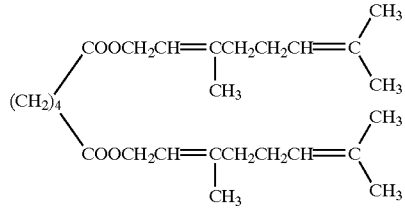
S-116
S-117
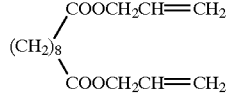
S-118
S-119
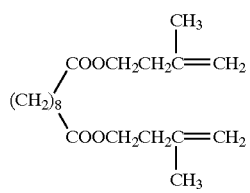
S-120

-continued
S-121 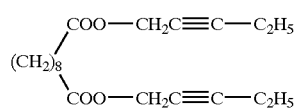
S-122 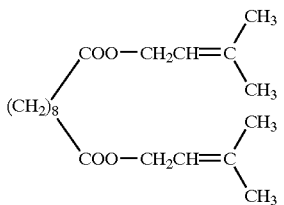
S-123 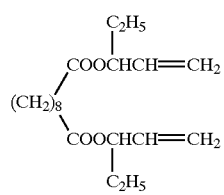
S-124 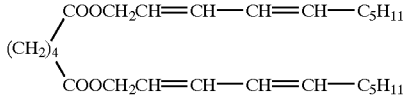
S-125 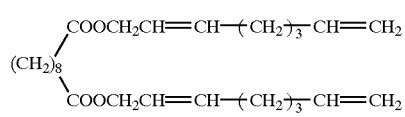
S-126 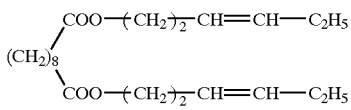
S-127 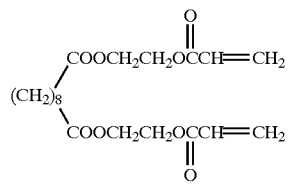
S-128 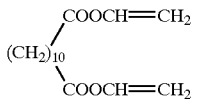
S-129 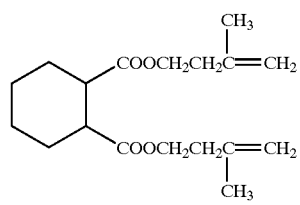
S-130 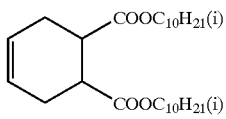
S-131 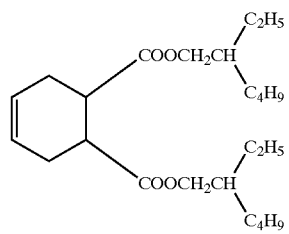
S-132 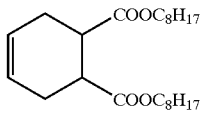
S-133 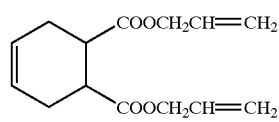
S-134 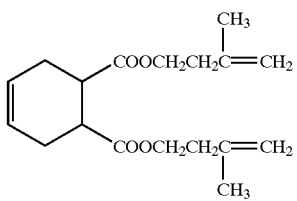
S-135 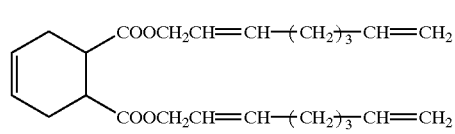
S-136 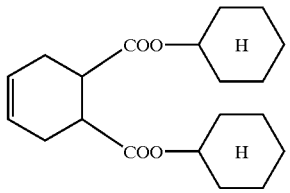

-continued
S-137 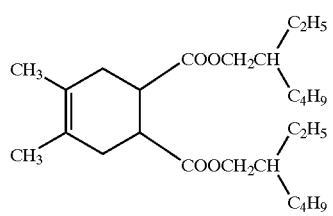
S-138 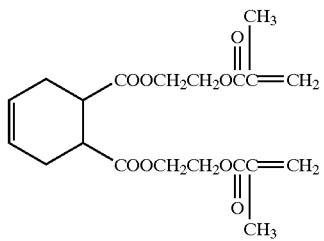
S-139 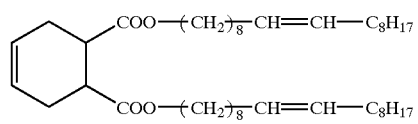
S-140 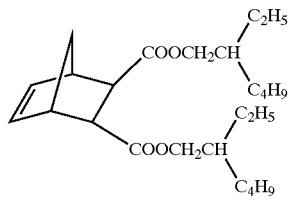
S-141
S-142 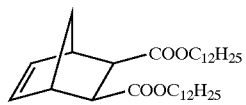
S-143
S-144 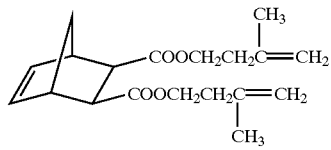
S-145
S-146 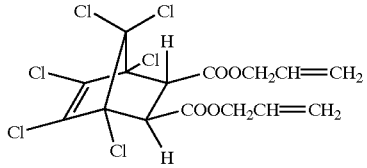
S-147
S-148 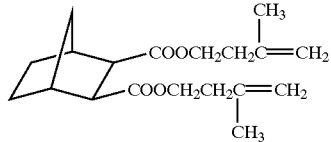
S-149
S-150 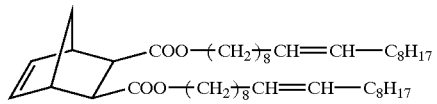
S-151
S-152 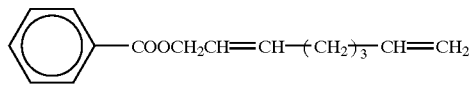
S-153
S-154 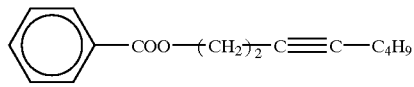

-continued

-continued
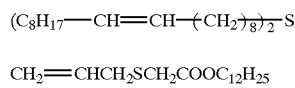 S-179
(CH$_2$=CH—(CH$_2$)$_3$—CH=CHCH$_2$)$_2$S  S-180
CH$_2$=CHCH$_2$SCH$_2$COOC$_{12}$H$_{25}$  S-181
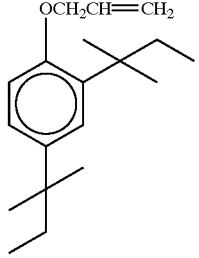 S-182
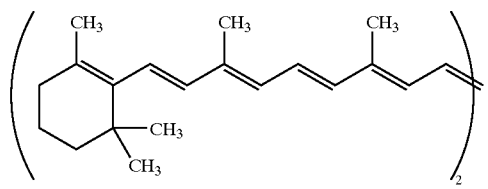 S-183
β-carotene
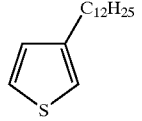 S-184
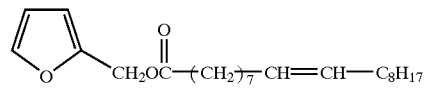 S-185
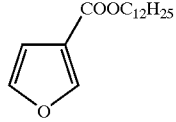 S-186
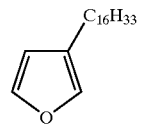 S-187
C$_{14}$H$_{29}$—CH=CH$_2$  S-188
C$_7$H$_{16}$—CH=CH—CH=CH—CH$_2$OH  S-189
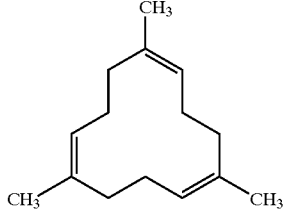 S-190
CH$_2$=CH—(CH$_2$)$_2$—CH=CH—(CH$_2$)$_2$—CH=CH$_2$  S-192
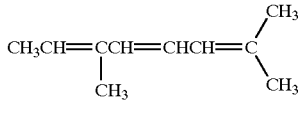 S-191
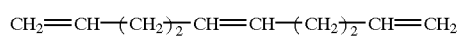 S-193
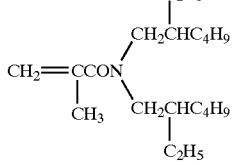 S-194
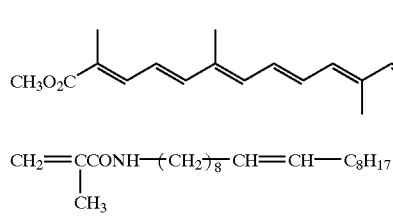 S-196
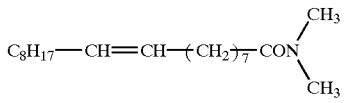 S-195
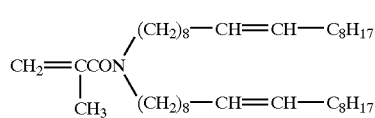 S-197
C$_8$H$_{17}$—CH=CH—(CH$_2$)$_7$—CON(CH$_3$)$_2$  S-198

-continued

S-199: C₈H₁₇—CH=CH—(CH₂)₇—CONH₂

S-200: C₁₇H₃₅CON(CH₂CH=CH₂)₂

S-201: C₈H₁₇—CH=CH—(CH₂)₇—CON(CH₂CH=CH₂)₂

S-202: C₈H₁₇—CH=CH—(CH₂)₇—CO-N(piperidine)

S-203: pyrrolidinone-N—CH₂CH=CH—(CH₂)₃—CH=CH₂

S-204: 1,3-diphenylisobenzofuran

S-205: 9,10-dimethylanthracene

S-206: 9,10-bis(octyloxy)anthracene (OC₈H₁₇)

S-207: 1,4-bis(dodecyloxy)naphthalene (OC₁₂H₂₅)

S-208: 1,3-didodecylbenzo[c]thiophene (C₁₂H₂₅)

S-209: indole—CH₂CH(NHCOCH₃)COOCH₂CH=CH₂

S-210: polyene—COOC₂H₅

S-211: polyene—COOC₂H₅

S-212: polyene—OCOCH₃

S-213: CHCOOCH₂CH(C₂H₅)C₄H₉ ‖ CHCOOCH₂CH(C₂H₅)C₄H₉

S-214: C₄H₉CH(C₂H₅)CH₂OOCCH ‖ CHCOOCH₂CH(C₂H₅)C₄H₉

S-215: CH₂OCO—(CH₂)₇—CH=CH—C₈H₁₇
CHOCO—(CH₂)₇—CH=CH—C₈H₁₇
CH₂OCO—(CH₂)₇—CH=CH—C₈H₁₇

S-216: CHCOOCH₂(CF₂)₄H ‖ CHCOOCH₂(CF₂)₄H

S-217: C₈H₁₇—CH=CH—(CH₂)₈—Cl

S-218: (C₈H₁₇—CH=CH—(CH₂)₇—COOCH₂)₂

S-219

CH$_2$=CH—(CH$_2$)$_8$—COOCH$_2$CH=CH$_2$

S-220

CH$_2$=CH—(CH$_2$)$_8$—COOCH$_2$CH$_2$CH=CH$_2$
|
CH$_3$

S-221

CH$_2$=CH—(CH$_2$)$_8$—COOCH$_2$CH=CH—(CH$_2$)$_8$—CH=CH$_2$

Oil-Soluble Dye

The type of the oil-soluble dye is not particularly limited, and can be appropriately selected from oil-soluble dyes known in the prior art, depending on purposes.

Of oil-soluble dyes usable in the present invention, any yellow dye can be used. For example, there can be used aryl or heterylazo dyes having phenols, naphthols, anilines, pirazolones, pyridones or opened-type active methylene compounds as a coupling component; azomethine dyes having opened-type active methylene compounds as a coupling component; methine dyes such as benzylidene dyes, monomethineoxonol dyes and the like, for example; quinone-based dyes such as naphthoquinone dyes, anthraquinone dyes and the like; and other compound. Additionally, dyes such as quinophthalone dyes, nitro nitroso dyes, acrydine dyes, acrydinone dyes and the like can also be used.

Of oil-soluble dyes usable in the present invention, any magenta dye can be used. For example, there can be used aryl or heterylazo dyes having phenols, naphthols or anilines as a coupling component; azomethine dyes having pyrazolones or pyrazolotriazoles as a coupling component; methine dyes such as arylidene dyes, styryl dyes, merocyanine dyes or oxonol dyes; carbonium dyes such as diphenylmethane dyes, triphenylmethane dyes or xanthene dyes; quinone-based dyes such as naphthoquinone, anthraquinone, anthrapyridone and the like; condensed polycyclic dyes such as dioxazine dyes and the like; and other compounds.

Of oil-soluble dyes usable in the present invention, any cyan dye can be used. For example, there can be used azomethine dyes such as indoaniline dyes or indophenol dyes; polymethine dyes such as cyanine dyes, oxonol dyes, merocyanine dyes and the like; carbonium dyes such as diphenylmethane dyes, triphenylmethane dyes or xanthene dyes; phthalocyanine dyes; anthraquinone dyes; aryl or heterylazo dyes having phenols, naphthols or anilines as a coupling component; indigos thioindigo dyes; and the like.

Though the above-mentioned each dye has a chromophore in the structure, there can also be used, in the present invention, dyes which do not develop color (yellow, magenta, cyan or the like) until decomposition of a part of the chromophore. As a counter cation to be decomposed, inorganic cations such as cations of alkali metals, ammonium ions and the like may be used, or organic cations such as pyridinium ions, quaternary ammonium ions and the like may be used and, further, polymer cations containing these cations as a part of the structure may also be used.

Of these, dyes represented by the following general formula (I) are preferable.

General formula (I)

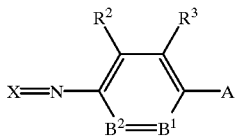

In the above-mentioned general formula (I), X represents a residual group of a color coupler, A represents —NR$^4$R$^5$ or a hydroxy group, R$^4$ and R$^5$ each independently represents a hydrogen atom, aliphatic group, aromatic group or heterocyclic group. A is preferably —NR$^4$R$^5$. R$^4$ and R$^5$ each independently represents preferably a hydrogen atom or aliphatic group, and further preferably a hydrogen atom, alkyl group or substituted alkyl group, and most preferably a hydrogen atom, an alkyl group having 1 to 18 carbon atoms or a substituted alkyl group having 1 to 18 carbon atoms.

In the above-described formula (I), B$^1$ represents =C(R$^6$)— or =N—, and B$^2$ represents —C(R$^7$)= or —N=. It is preferable that B$^1$ and B$^2$ do not simultaneously represent —N=, and it is more preferable that B$^1$ represents =C(R$^6$)— and B$^2$ represents —C(R$^7$)=.

In the general formula (I), R$^2$, R$^3$, R$^6$ and R$^7$ each independently represents a hydrogen atom, halogen atom, aliphatic group, aromatic group, heterocyclic group, cyano group, —OR$^{51}$, —SR$^{52}$, —CO$_2$R$^{53}$, —OCOR$^{54}$, —NR$^{55}$R$^{56}$, —CONR$^{57}$R$^{58}$, —SO$_2$R$^{59}$, —SO$_2$NR$^{60}$R$^{61}$, NR$^{62}$CONR$^{63}$R$^{64}$—NR$^{65}$CO$_2$R$^{66}$, —COR$^{67}$, —NR$^{68}$COR$^{69}$ or —NR$^{70}$SO$_2$R$^{71}$, and R$^{51}$, R$^{52}$R$^{53}$R$^{54}$R$^{55}$R$^{56}$, R$^{57}$, R$^{58}$, R$^{59}$, R$^{60}$, R$^{61}$, R$^{62}$, R$^{63}$, R$^{64}$, R$^{65}$, R$^{66}$, R$^{67}$, R$^{68}$, R$^{69}$, R$^{70}$, and R$^{71}$ each independently represents a hydrogen atom, aliphatic group or aromatic group.

R$^2$ and R$^7$ each independently represents, among the above-mentioned moieties, preferably a hydrogen atom, halogen atom, aliphatic group, —OR$^{51}$, —NR$^{62}$CONR$^{63}$R$^{64}$, —NR$^{65}$CO$_2$R$^{66}$, —NR$^{68}$COR$^{69}$, or —NR$^{70}$SO$_2$R$^{71}$, further preferably a hydrogen atom, fluorine atom, chlorine atom, alkyl group, substituted alkyl group, —NR$^{62}$CONR$^{63}$R$^{64}$, or —NR$^{68}$COR$^{69}$, still further preferably a hydrogen atom, chlorine atom, alkyl group having 1 to 10 carbon atoms, or substituted alkyl group having 1 to 10 carbon atoms, and most preferably a hydrogen atom, alkyl group having 1 to 4 carbon atoms, or substituted alkyl group having 1 to 4 carbon atoms.

R$^3$ and R$^6$ each independently represents, among the above-mentioned moieties, preferably a hydrogen atom, halogen atom, or aliphatic group, further preferably a hydrogen atom, fluorine atom, chlorine atom, alkyl group, or substituted alkyl group, still further preferably a hydrogen atom, chlorine atom, alkyl group having 1 to 10 carbon atoms, or substituted alkyl group having 1 to 10 carbon atoms, and most preferably a hydrogen atom, alkyl group having 1 to 4 carbon atoms, or substituted alkyl group having 1 to 4 carbon atoms.

In the general formula (I), R$^2$ and R$^3$, R$^3$ and R$^4$, R$^4$ and R$^5$, R$^5$ and R$^6$, or R$^6$ and R$^7$ may bond with each other to form rings. As a combination to form rings, combinations of R$^3$ and R$^4$, R$^4$ and R$^5$, and R$^5$ and R$^6$ are preferable. A ring formed by mutual bonding of R$^2$ and R$^3$, or R$^6$ and R$^7$ is preferably a 5-member ring or 6-member ring. The ring is preferably an aromatic ring (for example, a benzene ring) or an unsaturated heterocyclic ring (for example, a pyridine ring, imidazole ring, thiazole ring, pyrimidine ring, pyrrole ring, or furan ring). A ring formed by mutual bonding of R$^3$ and R$^4$, or R$^5$ and R$^6$ is preferably a 5-member ring or 6-member ring. Examples of the ring include a tetrahydroquinoline ring and dihydroindole ring. A ring formed by mutual bonding of $R^4$ and $R^5$ is preferably a 5-member ring or 6-member ring. Examples of the ring include a pyrrolidine ring, piperidine ring and morpholine ring.

In the present specification, aliphatic group means an alkyl group, substituted alkyl group, alkenyl group, substituted alkenyl group, alkynyl group, substituted alkynyl group, aralkyl group or substituted aralkyl group.

The alkyl group may have branching, or may form a ring. The number of carbon atoms in the alkyl group is preferably from 1 to 20, and further preferably from 1 to 18.

An alkyl moiety of the substituted alkyl group is the same as in the above-mentioned alkyl group.

The alkenyl group may have branching, or may form a ring. The number of carbon atoms in the alkenyl group is preferably from 2 to 20, and further preferably from 2 to 18.

An alkenyl moiety of the substituted alkenyl group is the same as in the above-mentioned alkenyl group.

The alkynyl group may have branching, or may form a ring. The number of carbon atoms in the alkynyl group is preferably from 2 to 20, and further preferably from 2 to 18.

An alkynyl moiety of the substituted alkynyl group is the same as in the above-mentioned alkynyl group.

An alkyl moiety of the aralkyl group and substituted aralkyl group is the same as in the above-mentioned alkyl group. An aryl moiety of the aralkyl group and substituted aralkyl group is the same as in the following aryl group Examples of substituents on the substituted alkyl group, substituted alkenyl group, substituted alkynyl group and substituents on an alkyl moiety of the substituted aralkyl group include a halogen atom, cyano group, nitro group, heterocyclic group, $—OR^{111}$, $—SR^{112}$, $—CO_2R^{113}$, $—NR^{114}R^{115}$, $—CONR^{116}R^{117}$, $—SO_2R^{118}—SO_2NR^{119}R^{120}$, $R^{111}$, $R^{112}$, $R^{113}$, $R^{114}$, $R^{115}$, $R^{116}$, $R^{117}$, $R^{118}$, $R^{119}$ and $R^{120}$ each independently represents a hydrogen atom, aliphatic group or aromatic group.

Examples of substituents on an aryl moiety of the substituted aralkyl group are the same as the following examples of substituents on the substituted aryl group.

In the present specification, aromatic group means an aryl group or substituted aryl group. The aryl group is preferably a phenyl group or naphthyl group, and particularly preferably a phenyl group.

An aryl moiety of the substituted aryl group is the same as in the above-mentioned aryl group.

Examples of substituents on the substituted aryl group include a halogen atom, cyano group, nitro group, aliphatic group, heterocyclic group, $—OR^{121}$, $—SR^{122}$, $—CO_2R^{123}$, $—NR^{124}R^{125}$, $—CONR^{126}R^{127}$, $—SO_2—SO_2NR^{129}R^{130}$, $R^{121}$, $R^{122}$, $R^{123}$, $R^{124}$, $R^{125}$, $R^{126}$, $R^{127}$, $R^{128}$, $R^{129}$ and $R^{130}$ each independently represents a hydrogen atom, aliphatic group or aromatic group.

In the present specification, the heterocyclic group includes both of groups having a saturated ring and groups having an unsaturated ring. The heterocyclic ring is preferably a 5-member or 6-member ring. Further, the heterocyclic ring may be condensed with an aliphatic ring, aromatic ring or other heterocyclic ring. The hetero atom in the heterocyclic ring includes B, N, O, S, Se and Te. Of these, the hetero atom is preferably N, O or S. A heterocyclic group in which a carbon atom, among atoms constituting the heterocyclic ring, has free atomic valency (monovalency) is preferable (a heterocyclic group is bonded at a carbon atom). Examples of the saturated heterocyclic ring include a pyrrolidine ring, morpholine ring, 2-bora-1,3-dioxorane ring and 1,3-thiazolidine ring. Examples of the unsaturated heterocyclic ring include an imidazole ring, thiazole ring, benzothiazole ring, benzooxazole ring, benzotriazole ring, benzoselenazole ring, pyridine ring, pyrimidine ring and quinoline ring.

The heterocyclic group may have a substituent. Examples of this substituent include a halogen atom, cyano group, nitro group, aliphatic group, aromatic group, heterocyclic group, $—OR^{131}$, $—SR^{132}$, $—CO_2R^{133}$, $—NR^{134}R^{135}$, $—CONR^{136}R^{137}$, $—SO_2R^{138}$, and $—SO_2NR^{139}R^{140}$. $R^{131}$, $R^{132}$, $R^{133}$, $R^{134}$, $R^{135}$, $R^{136}$, $R^{137}$, $R^{138}$, $R^{139}$, and $R^{140}$ each independently represents a hydrogen atom, aliphatic group or aromatic group.

In the general formula (I), couplers represented by X are preferably the following couplers.

As the yellow coupler, examples include couplers represented by the formulae (I) and (II) described in U.S. Pat. Nos. 3,933,501, 4,022,620, 4,326,024, 4,401,752 and 4,248,961, Japanese Patent Application Publication (JP-B) No. 58-10739, GB Patent Nos. 1,425,020 and 1,476,760, U.S. Pat. Nos. 3,973,968, 4,314,023 and 4,511,649, EU Patent Nos. 249,473A and 502,424A, couplers represented by the formulae (1) and (2) described in EU Patent No. 513,496A (particularly Y-28 described on page 18), couplers represented by the formula (1) described in claim 1 of EU Patent No. 568,037A, couplers represented by the general formula (1) described in U.S. Pat. No. 5,066,576, column 1, line 45 to 55, couplers represented by the general formula (1) described in JP-A No. 4-274425, paragraph 0008, couplers represented by the formula (1) described in EU Patent No. 498,381A1, p. 40, claim 1 (particularly D-35 described on page 18), couplers represented by the formula (Y) described in EU Patent No. 447,969A, p. 4 (particularly Y-1 (page 17) and Y-54 (page 41)) and couplers represented by the formulae (II) to (IV) described in U.S. Pat. No. 4,476,219, column 7, line. 36 to 58 (particularly II-17, 19 (column 17) and II-24 (column 19)).

As the magenta coupler, there are listed compounds described in U.S. Pat. Nos. 4,310,619 and 4,351,897, EU Patent No. 73,636, U.S. Pat. Nos. 3,061,432, 3,725,067, Research Disclosure Nos. 24220 (Jun 1984) and 24230 (Jun 1984), JP-A Nos. 60-33552, 60-43659, 61-72238, 60-35730, 55-118034 and 60-185951, U.S. Pat. Nos. 4,500,630, 4,540,654 and 4,556,630, International publication WO 88/04795, JP-A Nos. 3-39737 (L-57 (page 11, lower right column), L-68 (page 12, lower right column, L-77 (page 13, lower right column), [A-43]-63 (page 134), [A-43]-73, -75 (page 139) described in EU Patent No. 456,257, M-4, -6 (page 26), M-7 (page 27) described in EU Patent No. 486, 965, M-458(page 19) described in EU Patent No. 486,959A, (M-1) described in JP-A No. 5-204106 (page 6), and M-22 described in JP-A No. 4-362631, paragraph 0237.

As the cyan coupler, there are listed compounds described in U.S. Pat. Nos. 4,052,212, 4,146,396, 4,228,233 and 4,296,200, EU Patent No. 73,636, and CX-1, 3, 4, 5, 11, 12, 14, and 15 (pages 14 to 16) described in JP-A No. 4-204843; C-7, 10 (page 35), 34, 35 (page 37), I-1, I-17 (pages 42 to 43) described in JP-A No. 4-43345; and couplers represented by the general formula (Ia) or (Ib) described in JP-A No. 6-67385, claim 1.

In addition, couplers described in JP-A Nos. 62-215227 (page 91) and 2-33144 (pages 3, 30) and EP 355,660A (pages 4, 5, 45, 47) are also useful.

Of compounds represented by the above-mentioned general formula (I), compounds represented by the following general formula (II) are particularly preferably used as the magenta dye.

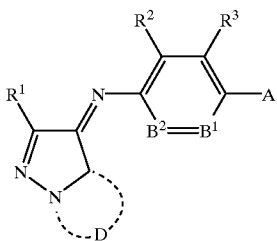

General formula (II)

In the general formula (II), $R^1$ represents a hydrogen atom, aliphatic group, aromatic group, heterocyclic group, cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $NR^{25}CO_2R^{26}$, $-COR^{27}$, $-NR^{28}COR^{29}$, or $-NR^{30}SO_2R^{31}$, and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ each independently represents a hydrogen atom, aliphatic group or aromatic group. $R^2$, $R^3$, A, $B^1$ and $B^2$ are as defined in the general formula (I), and preferable ranges thereof are the same.

In the above-mentioned general formula (II), D represents a group of atoms forming a 5-member or 6-member nitrogen-containing heterocyclic ring which may be substituted by at least one of an aliphatic group, aromatic group, heterocyclic group, cyano group, $-OR^{81}$, $-SR^{82}$, $-CO_2R^{83}$, $-OCOR^{84}$, $-NR^{85}R^{86}$, $-CONR^{87}R^{88}$, $-SO_2R^{89}$, $-SO_2NR^{90}R^{91}$, $-NR^{92}CONR^{93}R^{94}$, $-NR^{95}CO_2R^{96}$, $-COR^{97}$, $-NR^{98}COR^{99}$, or $-NR^{100}SO_2R^{101}$, and this heterocyclic ring may further form a condensed ring with other ring. Here, $R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$, and $R^{101}$ each independently represents a hydrogen atom, aliphatic group or aromatic group.

Of compounds represented by the general formula (II), those in which A is $-NR^4R^5$ are further preferable.

Next, the general formula (II) will be described in further in detail. $R^1$ represents, of the above-mentioned groups, preferably a hydrogen atom, aliphatic group, aromatic group, $-OR^{11}$, $-SR^{12}$, $-NR^{15}R^{16}$, $-SO_2R^{19}$, $-NR^{22}CONR^{23}R^{24}$, $-NR^{25}CO_2R^{26}$, $-NR^{28}COR^{29}$, or $-NR^{30}SO_2R^{31}$, more preferably a hydrogen atom, aliphatic group, aromatic group, $-OR^{11}$, or $-NR^{15}R^{16}$, still more preferably a hydrogen atom, alkyl group, substituted alkyl group, aryl group, substituted aryl group, alkoxy group, substituted alkoxy group, phenoxy group, substituted phenoxy group, dialkylamino group, or substituted dialkylamino group, further preferably a hydrogen atom, alkyl group having 1 to 10 carbon atoms, substituted alkyl group having 1 to 10 carbon atoms, aryl group having 6 to 10 carbon atoms or substituted aryl group having 6 to 10 carbon atoms, and most preferably a hydrogen atom, alkyl group having 1 to 6 carbon atoms, or substituted alkyl group having 1 to 6 carbon atoms.

D preferably forms a 5-member nitrogen-containing heterocyclic ring, and examples of the 5-member nitrogen-containing heterocyclic ring include an imidazole ring, triazole ring and tetrazole ring.

Of compounds represented by the above-mentioned general formula (II), pyrazolotriazoleazomethine compounds represented by the following general formula (III) are preferable.

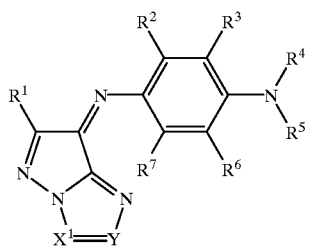

General formula (III)

In this formula, $R^1$, $R^2$, $R^3$, $R^4$, $R^5$, $R^6$ and $R^7$ have the same definitions as in the above-mentioned general formula (II). $X^1$ and Y each independently represents $-C(R^8)=$ or $-N=$, $R^8$ represents a hydrogen atom, aliphatic group or aromatic group, one of $X^1$ and Y is necessarily $-N=$, and $X^1$ and Y do not simultaneously represent $-N=$.

Here, $R^8$ represents preferably a hydrogen atom, alkyl group, substituted alkyl group, aryl group, or substituted aryl group, further preferably a hydrogen atom, alkyl group having 1 to 150 carbon atoms, or substituted aryl group having 6 to 150 carbon atoms, and most preferably an alkyl group having 1 to 100 carbon atoms, or substituted aryl group having 6 to 100 carbon atoms.

Of compounds represented by the above-mentioned general formula (III), pyrazolotriazoleazomethine compounds in which $X^1$ represents $-N=$, and Y represents $-C(R^8)=$ are more preferable.

Exemplified compounds (M-1 to 16) of the pyrazolotriazoleazomethine compound represented by the general formula (II) are listed below.

M-1

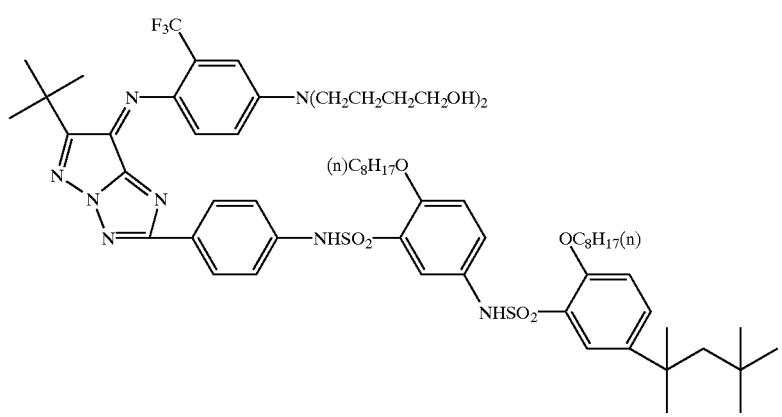

-continued
M-2
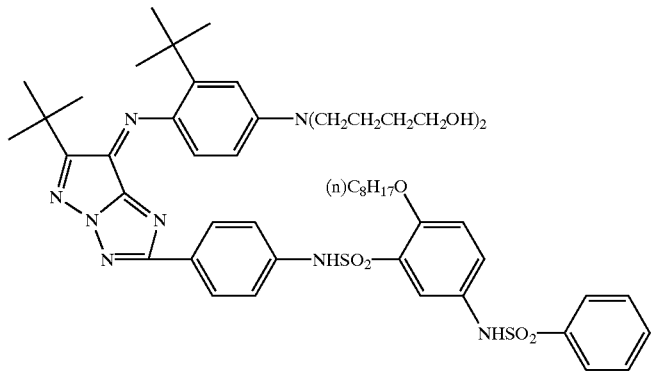
M-3
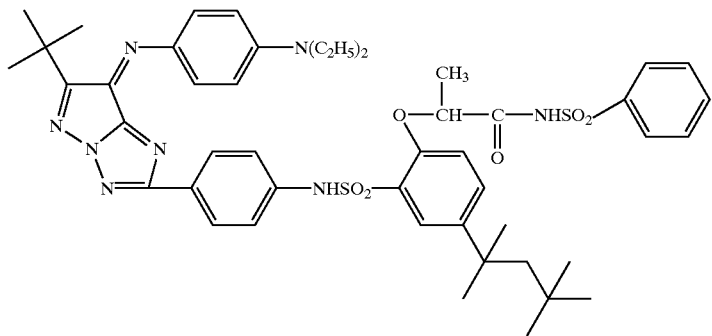
M-4
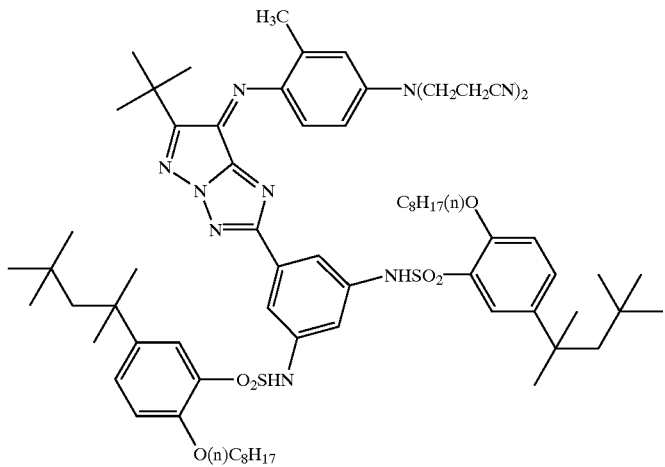
M-5
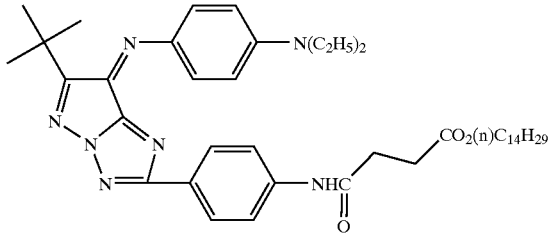

-continued
M-6
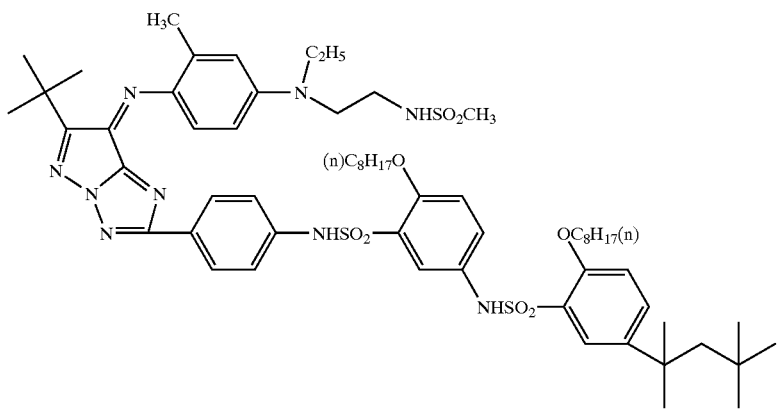
M-7
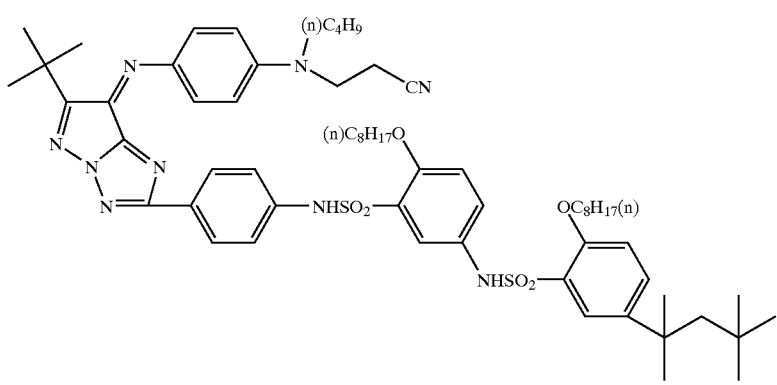
M-8
M-9
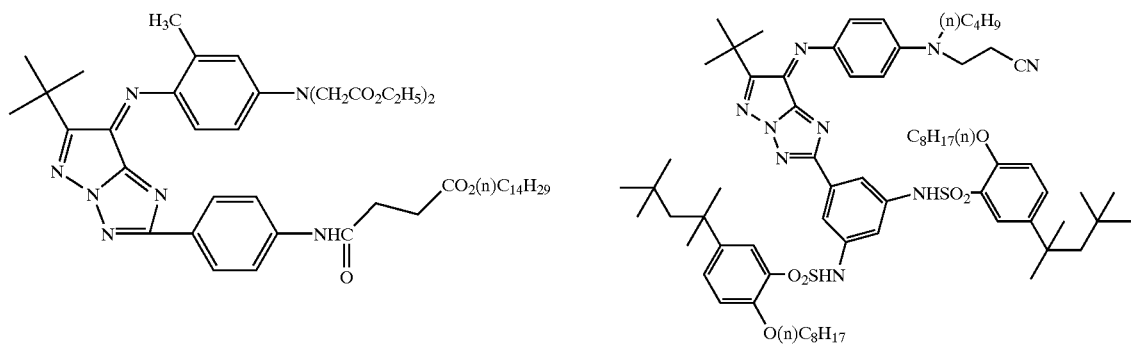
M-10
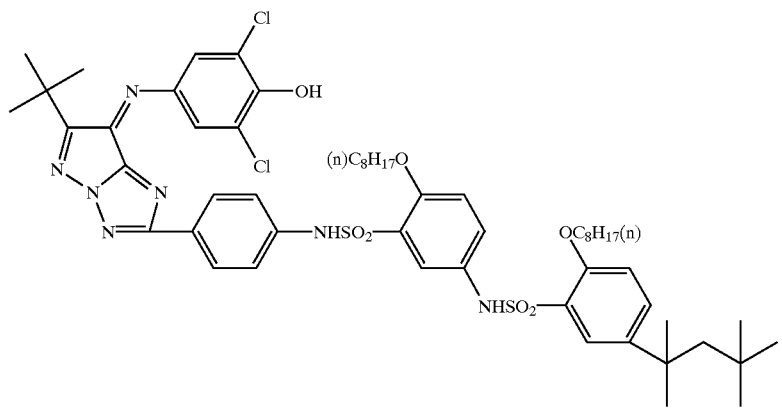

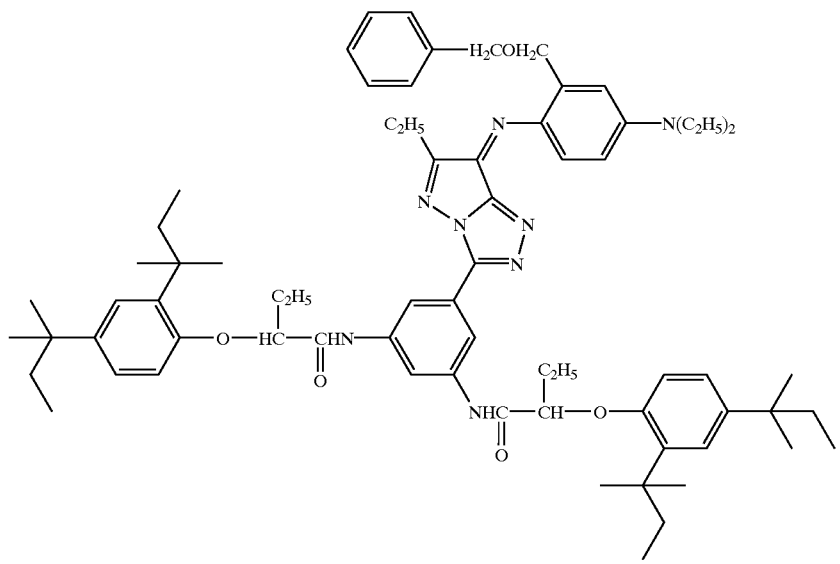
M11
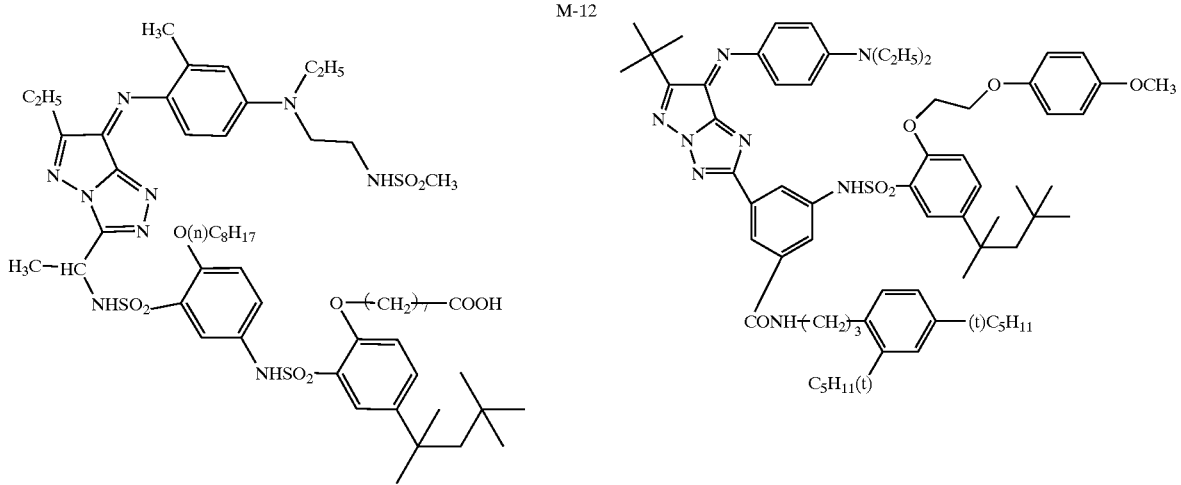
M-12
M-13
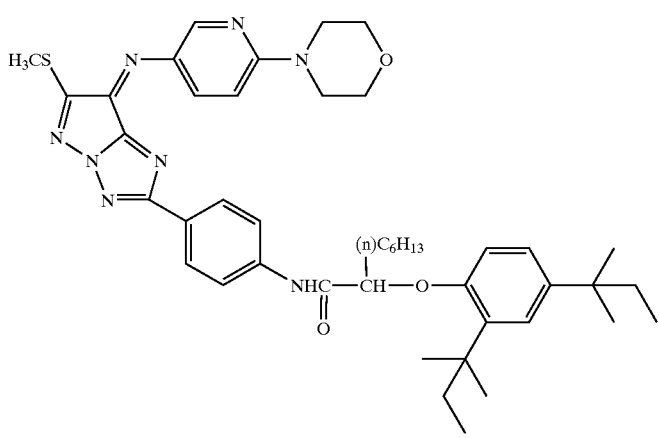
M-14

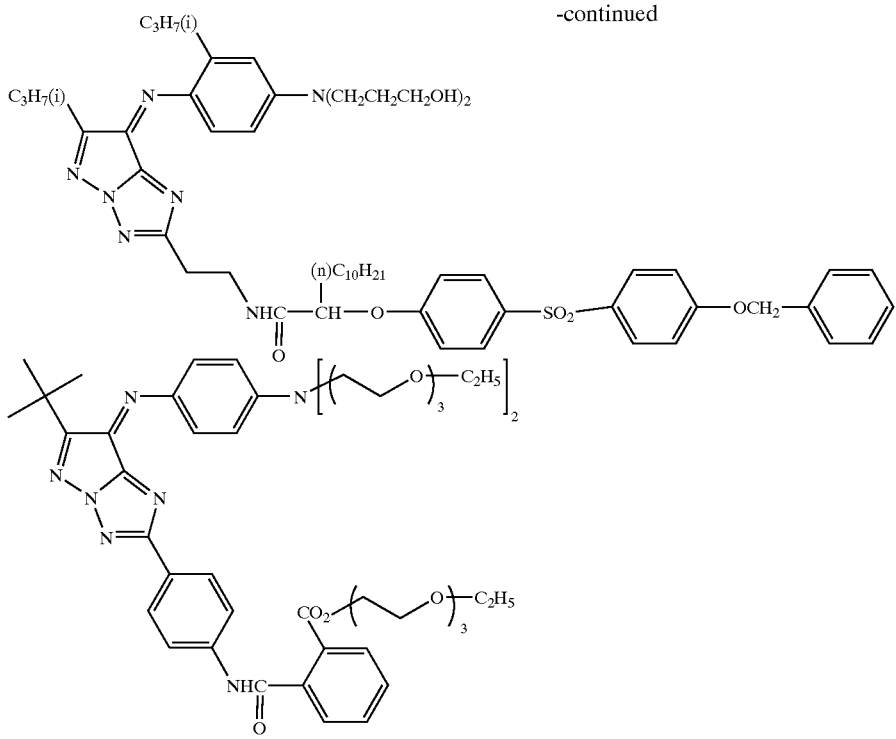

M-15

M-16

Examples of compounds usable in the present invention include, but are not limited to, exemplified compounds described in Japanese Patent Application No. 11-365189.

The pigment represented by the general formula (II) can be synthesized, for example, by referring to methods described in JP-A No. 4-126772, Japanese Patent Application Publication (JP-B) No. 7-94180 and Japanese Patent Application No. 11-365187.

As the cyan dye, pyrrolotriazoleazomethine compounds represented by the following general formulae (IV-1) to (IV-4) are particularly preferably used.

(IV-1)

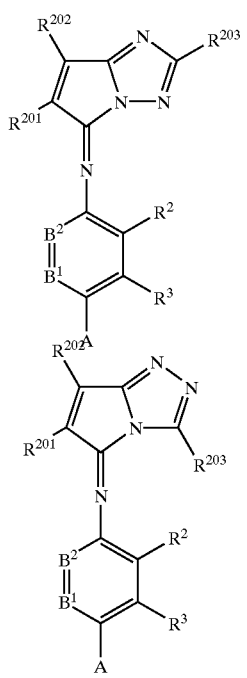

(IV-2)

(IV-3)

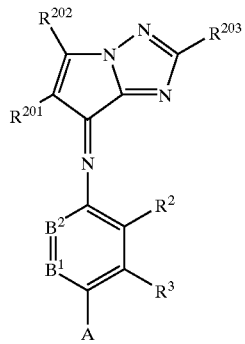

(IV-4)

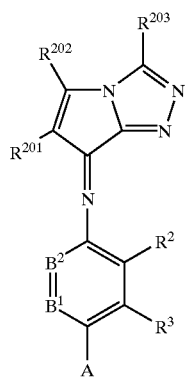

In the general formulae (IV-1) to (IV-4), A, $R^2$, $R^3$, $B^1$ and $B^2$ have the same definitions as in the general formula (I), and preferable ranges thereof are the same. $R^{201}$, $R^{202}$ and $R^{203}$ each independently has the same definition as $R^1$ in the general formula (II). $R^{201}$ and $R^{202}$ may bond mutually to form a ring structure.- stituent constant $\sigma_p$ value of 0.30 or more manifest sharp absorption and are more preferable. Pyrrolotriazoleazomethine compounds in which the sum of Hammett substituent constant $\sigma_p$ values of $R^{201}$ and $R^{202}$ is 0.70 or more manifest excellent hue as cyan color, and are further preferable.

Further detailed explanations will be made on hue. Pyrrolotriazoleazomethine compounds represented by the general formulae (IV-1) to (IV-4) manifest various hues depending on combination of $R^{201}$, $R^{202}$, $R^{203}$ and $R^2$, $R^3$, A, $B^1$ and $B^2$. Pyrrolotriazoleazomethine compounds represented by the general formulae (IV-1) to (IV-4) in which $R^{210}$ is a substituent having electron attractive property manifest more sharp absorption wave form and are preferable as compared with compounds in which $R^{201}$ is not an electron attractive substituent. When the electron attractive property is higher, the absorption wave form is more sharp. In this point, it is more preferable that $R^{201}$ is an electron attractive group having a Hammett substituent constant $\sigma_p$ value of 0.30 or more than that $R^{201}$ is an alkyl group or aryl group. Further, an electron attractive group having a Hammett substituent constant $\delta_p$ a value of 0.45 or more is more preferable, and the same having a Hammett substituent constant $\delta_p$ value of 0.60 or more is most preferable.

The above-mentioned pyrrolotriazoleazomethine compound can be used as a magenta pigment or cyan pigment. It is more preferable to use this compound as a cyan pigment. Further, pyrrolotriazoleazomethine compounds represented by the general formulae (IV-1) to (IV-4) can also be used as a magenta pigment. For use of pyrrolotriazoleazomethine compounds represented by the general formulae (IV-1) to (IV-4) as a cyan pigment, it is preferable that the sum of Hammett substituent constant $\sigma_p$ values of $R^{201}$ and $R^{202}$ is 0.70 or more. When this sum is less than 0.70, the absorption maximum wavelength is short for a cyan pigment, undesirably. Among others, those in which $R^{202}$ has a Hammett substituent constant $\sigma_p$ value of 0.30 or more are preferable. The sum of Hammett substituent constant $\sigma_p$ values of $R^{201}$ and $R^{202}$ is preferably 2.0 or less.

As the electron attractive group having a Hammett substituent constant $\sigma_p$ value of 0.30 or more, there are listed acyl groups, acyloxy groups, carbamoyl groups, alkoxycarbonyl groups, aryloxycarbonyl groups, cyano groups, nitro groups, alkylsulfinyl groups, arylsulfinyl groups, alkylsulfonyl groups, arylsulfonyl groups, sulfamoyl groups, halogenated alkyl groups, halogenated alkoxy groups, halogenated aryloxy groups, halogenated alkylthio groups, aryl groups substituted with two or more electron attractive groups having a $\sigma_p$ value of 0.15 or more, and heterocyclic rings. More specifically, there are listed acyl groups (for example, acetyl, 3-phenylpropanoyl), acyloxy groups (for example, acetoxy), canbamoyl groups (for example, N-ethylcarbamoyl, N,N-dibutylcarbamoyl, N-(2-dodecyloxyethyl)carbamoyl, N-methyl-N-dodecylcarbamoyl), alkoxycarbonyl groups (for example, methoxycarbonyl, butyloxycarbonyl, dodecyloxycarbonyl, octadecyloxycarbonyl), aryloxycarbonyl groups (for example, phenoxycarbonyl), cyano groups, nitro groups, alkylsulfinyl groups (for example, 3-phenoxypropylsulfinyl), arylsulfinyl groups (for example, 3-pentadecylphenylsulfinyl), alkylsulfonyl groups (for example, methanesulfonyl, octanesulfonyl), arylsulfonyl groups (for example, benzenesulfonyl), sulfamoyl groups (for example, N-ethylsulfamoyl, N,N-dipropylsulfamoyl), halogenated alkyl groups (for example, trifluoromethyl, heptafluoropropyl), halogenated alkoxy groups (for example, trifluoromethyloxy), halogenated aryloxy groups (for example, pentafluorophenyloxy), halogenated alkylthio groups (for example, difluoromethylthio), aryl groups substituted with two or more electron attractive groups having a $\sigma_p$ value of 0.15 or more (for example, 2,4-dinitrophenyl, 2,4,6-trichlorophenyl, pentachlorophenyl), and heterocyclic rings (for example, 2-benzooxazolyl, 2-benzothiazolyl, 1-phenyl-2-benzimidazolyl, 5-chloro-1-tetrazolyl, 1-pyrrolyl).

As the electron attractive group having a Hammett substituent constant $\sigma_p$ value of 0.45 or more, there are listed acyl groups (for example, acetyl, 3-phenylpropanoyl), alkoxycarbonyl groups (for example, methoxycarbonyl), aryloxycarbonyl groups (for example, m-chlorophenoxycarbonyl), cyano group, nitro group, alkylsulfinyl groups (for example, n-propylsulfinyl), arylsulfinyl groups (for example, phenylsulfinyl), alkylsulfonyl groups (for example, methanesulfonyl and n-octanesulfonyl), arylsulfonyl groups (for example, benzenesulfonyl), sulfamoyl groups (for example, N-ethylsulfamoyl and N,N-dimethylsulfamoyl), and halogenated alkyl groups (for example, trifluoromethyl). As the electron attractive group having a Hammett substituent constant $\sigma_p$ value of 0.60 or more, examples include a cyano group (0.66), nitro group (0.78) and methanesulfonyl group (0.72).

As the combination in which the sum of $\sigma_p$ values of $R^{201}$ and $R^{202}$ is 0.70 or more, combinations in which $R^{201}$ is selected from cyano groups, alkoxycarbonyl groups, alkylsulfonyl groups, arylsulfonyl groups and halogenated alkyl groups, and $R^{202}$ is selected from acyl groups, acyloxy groups, carbamoyl groups, alkoxycarbonyl groups, aryloxycarbonyl groups, cyano group, alkylsulfonyl groups, arylsulfonyl groups, sulfamoyl groups and halogenated alkyl groups are preferable.

The pyrrolotriazoleazomethine compound used in the present invention has a preferable structure is selected from compounds represented by the following general formula (IV-1a), in which $R^2$ is a hydrogen atom, alkyl group having 1 to 4 carbon atoms, substituted alkyl group having 1 to 4 carbon atoms, alkoxy group having 1 to 4 carbon atoms, halogen atom (fluorine, chlorine, or bromine), acylamino group having 1 to 5 carbon atoms, aminocarbonylamino group having 1 to 5 carbon atoms or alkoxycarbonylamino group having 2 to 5 carbon atoms; $R^4$ and $R^5$ each independently is a hydrogen atom, alkyl group having 1 to 18 carbon atoms or substituted alkyl group having 1 to 18 carbon atoms; $R^{201}$ and $R^{202}$ each independently represents an electron attractive group having a Hammett substituent constant $\sigma_p$ value of 0.30 or more, and $R^{203}$ is an alkyl group having 1 to 18 carbon atoms, substituted alkyl group having 1 to 18 carbon atoms, or substituted or unsubstituted aryl group having 6 to 20 carbon atoms. When used as a cyan pigment, those of the above-mentioned groups in which the sum of Hammett substituent constant $\sigma_p$ values of $R^{201}$ and $R^{202}$ is 0.70 or more are preferable, and those in which the sum of $\sigma_p$ values is 1.00 or more are further preferable. The pyrrolotriazoleazomethine compound used in the present invention has a most preferable structure selected from compounds represented by the general formula (IV-1a) in which $R^2$ is a hydrogen atom or methyl group; $R^4$ and $R^5$ each independently is an alkyl group having 1 to 5 carbon atoms; $R^{201}$ is a cyano group; $R^{202}$ is an alkoxycarbonyl group; and $R^{203}$ is an aryl group.

(IV-1a)

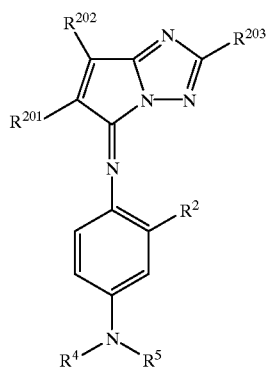

The Hammett substituent constant used in the present specification is described in Japanese Patent Application No. 11-365188, and the $\sigma_p$ value in the present invention is also as defined in the same.

Exemplified compounds (C-1 to 9) of the pyrrolotriazoleazomethine compound used in the present invention will be listed only for illustrating the present invention in detail; however, these compounds do not limit the scope of the present invention.

C-1

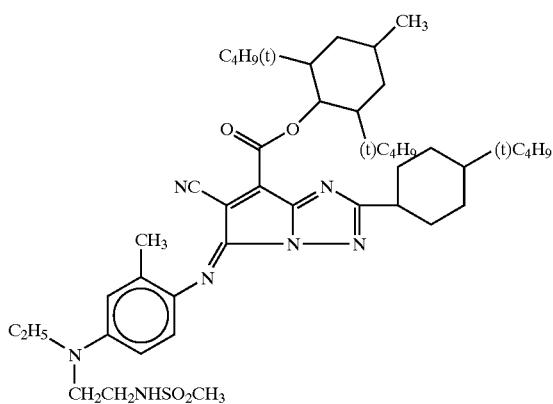

C-2

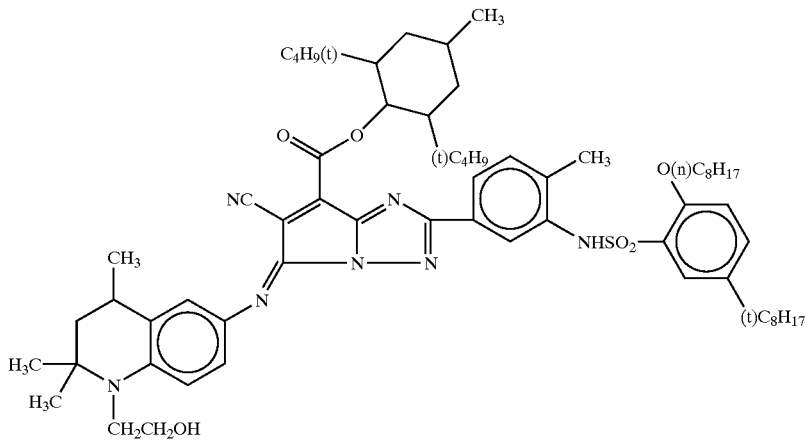

-continued
C-3
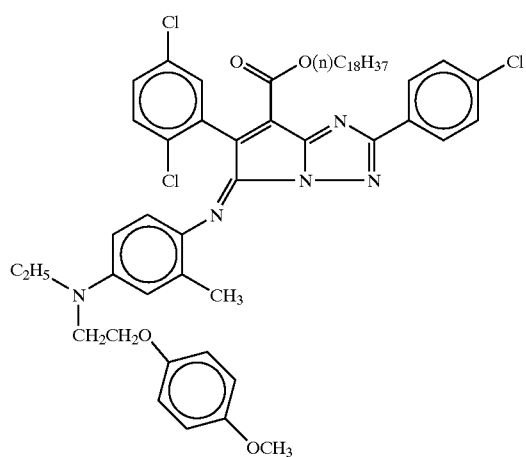
C-4
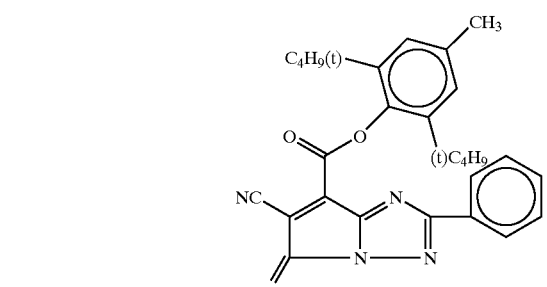
C-5
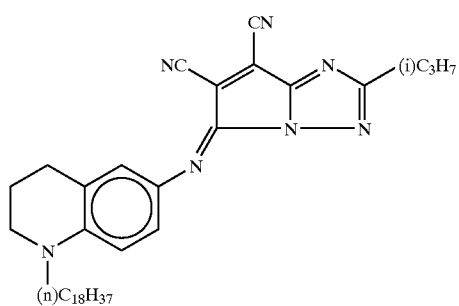
C-6
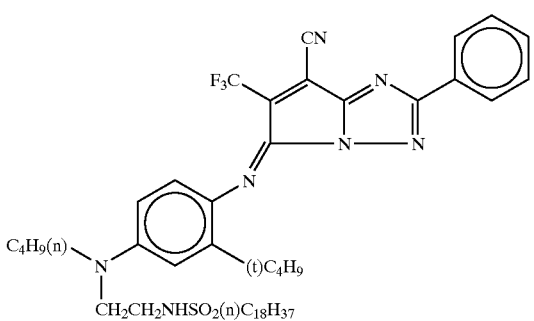
C-7
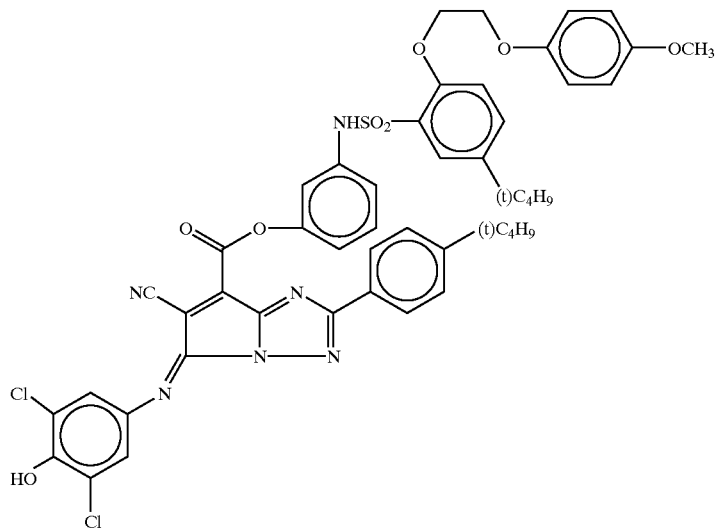
C-8
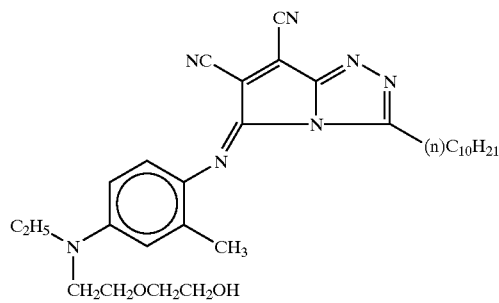
C-9
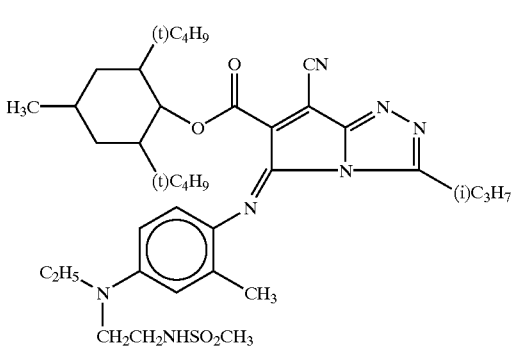

As compounds usable in the present invention, exemplified compounds described in Japanese Patent Application No. 11-365188 are further listed; however, these compounds do not limit the scope of the present invention.

The pyrrolotriazoleazomethine pigment represented by the general formulae (IV-1) to (IV-4) can be synthesized referring to methods described in JP-A Nos. 5-177959, 9-292679, 10-62926, and Japanese Patent Application No. 11-365188.

The content of the oil-soluble dye used in the present invention is 0.05 to 50% by mass, and preferably 0.1 to 10% by mass with respect to the ink.

High Boiling Point Organic Solvent

Examples of the high boiling point organic solvent used in the present invention include phthalic esters (for example, dibutyl phthalate, dioctyl phthalate, dicyclohexyl phthalate, di-2-ethylhexyl phthalate, decyl phthalate, bis(2,4-di-tert-amylphenyl) isophthalate, and bis(1,1-diethylpropyl) phthalate); phosphoric or phosphonic esters (for example, diphenyl phosphate, triphenyl phosphate, tricresyl phosphate, 2-ethylhexyl diphenyl phosphate, dioctylbutyl phosphate, tricyclohexyl phosphate, tri-2-ethylhexyl phosphate, tridodecyl phosphate, and di-2-ethylhexyl phenyl phosphate); benzoic esters (for example, 2-ethylhexyl benzoate, 2,4-dichlorobenzoate, dodecyl benzoate, and 2-ethylhexyl-p-hydroxybenzoate); amides (for example, N,N-diethyl dodecane amide, and N,N-diethyl lauryl amide); alcohols or phenols (isostearyl alcohol, 2,4-di-tert-amyl phenol, and the like); aliphatic esters (for example, dibutoxyethyl succinate, di-2-ethylhexyl succinate, 2-hexyldecyl tetradecanoate, tributyl citrate, diethyl azelate, isostearyl lactate, and trioctyl citrate); aniline derivatives (N,N-dibutyl-2-butoxy-5-tert-octyl aniline and the like); chlorinated paraffins (paraffins having a chlorine content of 10% to 80%); trimesic esters (for example, tributyl trimesate); dodecyl benzene; di-isopropyl naphthalene; phenols (for example, 2,4-di-tert-amyl phenol, 4-dodecyloxy-phenol, 4-dodecyloxy-carbonyl phenol, and 4-(4-dodecyloxy-phenyl-sulfonyl) phenol); carboxylic acids (for example, 2-(2,4-di-tert-amyl phenoxy) butyric acid, and 2-ethoxyoctane decanoic acid); alkyl phosphoric acids (for example, di-2(ethylhexyl) phosphoric acid, and diphenyl phosphoric acid) and the like. In addition to these solvents, another organic solvent having a boiling point of 30° C. to about 160° C. (for example, ethyl acetate, butyl acetate, ethyl propionate, methyl ethyl ketone, cyclohexanone, 2-ethoxyethyl acetate, and dimethylformamide) may be also used as a co-solvent.

These high boiling point organic solvents may be used alone or in combination of two or more. Examples of the combination include a combination of tricresyl phosphate and dibutyl phthalate, a combination of trioctyl phosphate and di(2-ethylhexyl) sebacate, and the like.

Examples of the high boiling point organic solvents, other than the above-mentioned examples, and/or examples of methods of synthesizing these high boiling point organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-Nos. 276,319A, 286,253A, 289,820A, 309,158A, 309,159A, 309,160A, 509, 311A and 510,576A, East Germany Patent Nos. 147,009, 157,147, 159,573 and 225,240A, GB-2,091,124A, JP-A Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946 and 4-346338, and so on.

The total amount of the high boiling point organic solvents used in the present invention is 0 to 10 times, and preferably 0 to 5 times by weight ratio as much as the amount of the oil-soluble dye is.

Other Components and the Like

In the present invention, it is possible to use the high boiling point organic solvent and a low boiling point organic solvent. The low boiling point organic solvent is an organic solvent having a boiling point of 150° C. or lower (usually, about 30° C. or higher) at normal pressure. Preferred examples thereof include esters (for example, ethyl acetate, butyl acetate, ethyl propionate, β-ethoxyethyl acetate, and methylcellosolve acetate), alcohols (for example, isopropyl alcohol, n-butyl alcohol, and sec-butyl alcohol), ketones (for example, methyl isobutyl ketone, methyl ethyl ketone, and cyclohexanone), amides (for example, dimethylformamide, and N-methylpyrrolidone), and ethers(for example, tetrahydrofuran and dioxane).

Emulsification and dispersion can be performed by dispersing an oil phase wherein the oil-soluble dye are dissolved in the high boiling point organic solvent, or a mixed solvent of the high boiling point organic solvent and the low boiling point organic solvent, into a water-based phase based on the water-based medium to form oily droplets (dispersed particles).

In general, the oily droplets (dispersed particles) are formed by adding the above-mentioned oil phase to the above-mentioned water-based phase. A so-called phase inversion emulsification, wherein the water-based phase is added to the oil phase, can be preferably used.

At the time of the emulsification and dispersion, if necessary, it is allowable to add additives such as a surfactant, a wetting agent, a dye stabilizer, an emulsion stabilizer, an antiseptic and an antifungal agent, described below, into at least one of the above-mentioned water-based phase and the above-mentioned oil phase.

Examples of the surfactant include anionic surfactants such as aliphatic acid salts, alkyl sulfate salts, alkylbenzenesulfonic acid salts, alkylnaphthalenesulfonic acid salts, dialkylsulfosuccinic acid salts, alkyl phosphate salts, naphthalenesulfonic acid formalin condensate, polyoxyethylene-alkylsulfate salts and the like; nonionic surfactants such as polyoxyethylene alkyl ether, polyoxyethylenealkyl allyl ether, polyoxyethylene aliphatic acid esters, sorbitan aliphatic acid esters, polyoxyethylenesorbitan aliphatic acid esters, polyoxyethylenealkylamine, glycerin aliphatic acid esters, and oxyethyleneoxypropylene block copolymers; SURFYNOLS (made by Air Products & Chemicals), which is an acetylene type polyoxyethyleneoxide surfactant; amineoxide type amphoteric surfactants such as N,N-dimethyl-N-alkylamineoxide; and surfactants described in JP-A No. 59-157,636 pp. 37–38 and Research Disclosure No. 308119 (1989).

In the present invention, a water-soluble polymer, together with one or more of these surfactants, can be added to attain stabilization immediately after emulsification.

Examples of the water-soluble polymer include polyvinyl alcohol, polyvinylpyrrolidone, polyethyleneoxide, polyacrylic acid, polyacrylamide, and copolymers thereof. Natural water-soluble polymers such as polysaccharide, casein and gelatin are also preferable.

Further, in order to stabilize the dye dispersion, compounds and the like which can be obtained by polymerizing derivatives of acrylic acid, ester, methacrylic ester, vinyl ester, acrylamide, methacrylamide, olefin, styrene, vinyl ether and acrylonitrile, which polymers do not substantially dissolve in the water-based medium, may be used. These polymers desirably contain $SO_2$ and COO. When these polymers which do not substantially dissolve in the water-based medium are also used, they are preferably used in an amount of 0.1 to 20% by mass, and more preferably used in an amount of 0.1 to 10% by mass with respect to the high boiling point organic solvents.

When the oil-soluble dye are dispersed by the emulsification and dispersion to prepare the water-based ink, it is particularly important to control the size of particles thereof. In order to improve color purity and density when an image is formed by ink jet recording, it is essential to make the average particle size of the dispersed particles small. Volume average particle size is preferably from 5 to 100 nm, and more preferably from 1 to 50 nm.

The volume average particle size can be easily measured by the well-known methods. For example, after the ink is diluted with distilled water so that the dye concentration in the ink is within a range from 0.1 to 1% by mass, the size can be easily measured by a volume average particle size measuring apparatus which is commercially available, e.g., MICROTRACK UPA (manufactured by Nikkiso Co., Ltd.).

It has been found that the presence of coarse particles plays a very important role in printing performance. That is, it has been found that by blocking of nozzles of a printing head with coarse particles or forming of stains without blocking of nozzles, no ink jetting of an ink jet printing ink or uneven ink jetting is caused, which has a serious effect on printing performance. To prevent this problem, it is preferred that the number of particles having a size of 5 $\mu$M m or more is set to 10 or less and that the number of particles having a size of 1 $\mu$m or more is set to 1000 or less, in 1 $\mu$l of the ink for the ink jet that is produced.

As a method for removing the coarse particles, known centrifugal separation, precise filtration or the like can be used. The separating method may be performed immediately after the emulsification and dispersion, or performed after adding respective additives, for example, the wetting agent and the surfactant, to the emulsified and dispersed product just before charging the ink into an ink cartridge.

As an effective means for making the average particle size of the dispersed particles small or removing the coarse particles, an emulsifying and dispersing machine in which mechanical stirring is performed is preferably used.

As the emulsifying and dispersing machine, there can be used known machines, such as a simple stirrer, or an impeller stirring type, in-line stirring type, mill type (for example, colloid mill), or ultrasound wave type machine. In the present invention, a high-pressure emulsification and dispersion machine is preferred. A high-pressure homogenizer is particularly preferred.

Detailed mechanism of the high-pressure homogenizer is described in U.S. Pat. No. 4,533,254, JP-A No. 6-47264 and the like. Examples of commercially available homogenizers include GAULIN HOMOGENIZER (made by A. P. V Gaulin Inc.), MICROFLUIDIZER (made by Microfluidex Inc.) and ALTIMIZER (made by Sugino Machine Co., Ltd.).

A high-pressure homogenizer having a mechanism for preparing particles in a super-high-pressure jet flow, as described in U.S. Pat. No. 5,720,551, is particularly effective for the emulsification and dispersion of the present invention. An example of the emulsifying and dispersing machine using the super-high-pressure jet flow is DeBEE 2000 (Bee International Ltd.).

The pressure when the emulsifying and dispersing machine is used to carry out emulsification and dispersion is preferably 50 MPa or more (500 bar or more), more preferably 60 MPa or more (600 bar or more), and still more preferably 180 MPa or more (1800 bar or more).

In the present invention, it is particularly preferred that more emulsifying machines are used, utilizing, for example, a method of emulsifying raw materials with a stirring emulsifier and putting a resultant emulsion in a high-pressure homogenizer. It is also preferred to emulsify raw materials with such an emulsifier, and put the resultant emulsion into the high-pressure homogenizer after the addition of additives such as the wetting agent and the surfactant thereto, before the charging of the ink for the ink jet to be produced into the cartridge.

In a case that both the high boiling point organic solvent and the low boiling point organic solvent are emulsified and dispersed, it is preferred to remove almost all of the low boiling point organic solvent, in view of stability of the emulsion, safety and health.

As a method for removing almost all of the low boiling point solvent, it is possible to adopt any one of various known methods such as evaporation, vacuum evaporation, and ultrafiltration, depending on the type of the low boiling point solvent. The low boiling point solvent is preferably removed as early as possible after the emulsification.

The ink for the ink jet of the present invention can be preferably used for water-based writing inks, water-based printing inks, information-recording inks and the like.

The ink for the ink jet of the present invention may contain other components as required, as well as the above components. Examples of the other components are known additives such as drying preventing agents, penetration accelerators, ultraviolet light absorbers, antioxidants, anti-fungal agents, pH adjusters, surface tension adjusting agents, anti-foaming agents, viscosity adjusting agents, dispersion aids, dispersion stabilizers, anti-rusting agents, chelating agents, and the like.

The drying preventing agent is suitably used for the purpose of preventing clogging due to the ink for the ink jet drying at the ink jetting opening of the nozzle used in the ink jet recording method.

The drying preventing agent is preferably a water soluble organic solvent having a vapor pressure which is less than that of water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylol propane, and the like; lower alkyl ethers of polyhydric alcohols such as ethylene glycol monomethyl (or ethyl) ether, diethylene glycol monomethyl (or ethyl) ether, triethylene glycol monoethyl (or butyl) ether or the like; heterocyclics such as 2-pyrrolidone, N-methyl-2-pyrrolidone, 1,3-dimethyl-2-imidazolidinone, N-ethylmorpholine and the like; sulfur-containing compounds such as sulfolane, dimethylsulfoxide, 3-sulfolene and the like; polyfunctional compounds such as diacetone alcohol, diethanol amine, and the like; and urea derivatives.

Among these, polyhydric alcohols such as glycerin, diethylene glycol and the like are preferable. A single type of drying preventing agent may be used, or two or more types may be used in combination.

The amount of the drying preventing agent contained in the ink for the ink jet is preferably 10 to 50% by mass.

The penetration accelerator is preferably used for the purpose of better penetration of the ink for the ink jet into paper.

Examples of the penetration accelerator include alcohols such as ethanol, isopropanol, butanol, di(tri)ethylene glycol monobutyl ether, 1,2-hexanediol and the like; sodium lauryl sulfate, sodium oleate, nonionic surfactants, and the like.

The penetration accelerator is contained in a range which does not cause bleeding of the printed characters or print through. If the penetration accelerator is contained in the ink for the ink jet in an amount of 10 to 30% by mass, sufficient effects will usually be exhibited.

The UV light absorber is used for the purpose of improving the storability of images.

Examples of the UV light absorber are the benzotriazole compounds disclosed in JP-A Nos. 58-185677, 61-190537, 2-782, 5-197075, 9-34057, and the like; the benzophenone compounds disclosed in JP-A Nos. 46-2784, 5-194483, U.S. Pat. No. 3,214,463 and the like; the cinnamic acid compounds disclosed in JP-B Nos. 48-30492 and 56-21141, JP-A No. 10-88106 and the like; the triazine compounds disclosed in JP-A Nos. 4-298503, 8-53427, 8-239368, 10-182621, Japanese National Publication No. 8-501291, and the like; the compounds disclosed in Research Disclosure No. 24239; and compounds that absorb ultraviolet light and emit fluorescent light (so-called fluorescent whitening agents) such as stilbene compounds and benzooxazole compounds.

Antioxidants are used for the purpose of improving the storability of images.

For example, any of various types of organic color fading preventing agents and metal complex color fading preventing agents can be used as the antioxidant.

Examples of organic color fading preventing agents are hydroquinones, alkoxyphenols, dialkoxyphenols, phenols, anilines, amines, indanes, chromans, alkoxyanilines, heterocyclics, and the like.

Examples of metal complex color fading preventing agents include nickel complexes and zinc complexes. Specific examples include the compounds disclosed in Research Disclosure No. 17643 (VII, I through J), Research Disclosure No. 15162, Research Disclosure No. 18716 (page 650, left column), Research Disclosure No. 36544 (page 527), Research Disclosure No. 307105 (page 872), the compounds disclosed in the patents cited in Research Disclosure No. 15162, and the compounds included in the compound examples and general formulas of representative compounds disclosed on pages 127 through 137 of JP-A No. 62-215272.

Examples of the anti-fungal agent are sodium dehydroacetate, sodium benzoate, sodium pyridinethion-1-oxide, ethyl p-hydroxybenzoate, 1,2-benzoisothiazoline-3-on, and salts thereof. It is preferable to use the anti-fungal agent in the ink in an amount of 0.02 to 1.00% by mass.

Examples of the pH adjuster include hydroxides of alkali metals such as lithium hydroxide and potassium hydroxide; carbonates such as sodium carbonate and sodium hydrogencarbonate; inorganic bases such as potassium acetate, sodium silicate and disodium phosphate; and organic bases such as N-methyldiethanolamine and triethanolamine.

Examples of the surface tension adjuster include nonionic, cationic and anionic surfactants. For example, any surfactant that can be used in the above-mentioned emulsification and dispersion can be used. The surfactant used herein preferably has a solubility in water of 0.5% or more at 25° C.

As the dispersing agent and the dispersion stabilizer, the above-mentioned cationic, anionic and nonionic surfactants are preferred.

Examples of the antifoaming agent include fluorine-containing compounds, silicone type compounds, and chelate agents, a typical example of which is EDTA.

The pH of the ink for the ink jet is preferably from 6 to 10 and more preferably from 7 to 10 from the viewpoint of improvement in preservation stability.

The surface tension of the ink for the ink jet is preferably from 20 to 60 mN/m, and more preferably from 25 to 45 mN/m.

The viscosity of the ink for the ink jet is preferably 30 mPa·s or less and more preferably 20 mPa·s or less.

The ink for the ink jet of the present invention is favorably used in the following ink jet recording method of the present invention.

[Ink Jet Recording Method]

In the ink jet recording method, the ink for the ink jet of the present invention is used to record an image on an image-receiving material. Ink nozzles and so on used at this time are not particularly limited, and can be appropriately selected depending on the purpose of recording.

Image-Receiving Material

The type of the image-receiving material is not limited. This material is any known material on which images are formed. Examples thereof include plain paper; resin-coated paper; ink jet exclusive paper as described in, for example, JP-A Nos. 8-169172, 8-27693, 2-276670, 7-276789, 9-323475, 62-238783, 10-153989, 10-217473, 10-235995, 10-337947, 10-217597, 10-337947 and the like; films; paper that can also used for electrophotography; cloth; glass; metals; and ceramics.

In the present invention, recording paper and recording films comprising an image-receiving layer on a support are particularly preferred among the above-mentioned image-receiving materials.

Examples of the support include chemical pulp such as LBKP, NBKP and the like; mechanical pulp such as GP, PGW, RMP, TMP, CTMP, CMP, CGP, and the like; and used paper pulp such as DIP or the like. If needed, known pigments, binders, sizing agents, fixing agents, cationic agents, paper strength reinforcing agents and the like may be mixed in with the pulp. The support may be formed by using any type of machine such as a fourdrinier machine, a cylinder machine, or the like.

The support may be a synthetic paper, a plastic film sheet or the like.

The thickness of the support is preferably about 10 to 250 μm, and the weight thereof is preferably 10 to 250 g/m$^2$.

The image-receiving layer, as well as the backcoat layer which is selected as needed, may be directly laminated onto the support. Alternatively, the image-receiving layer and the backcoat layer may be provided after subjected to size pressing or coating of an undercoat layer by using starch, polyvinyl alcohol or the like.

The support may be subjected to flattening processing by a calendar device such as a machine calendar, a TG calendar, a soft calendar or the like.

Among the substrates, paper whose both surfaces are laminated with polyolefin (e.g., polyethylene, polystyrene, polyethyleneterephthalate, polybutene, and copolymers thereof), and plastic film are preferable. It is more preferable to include in the polyolefin a white pigment (e.g., titanium oxide, zinc oxide) or a hue providing dye (e.g., cobalt blue, ultramarine blue, neodium oxide).

The image-receiving layer includes a pigment, water based binder, mordant, water-proofing agent, light-resistance improving agent, surfactant, and other additives.

As the pigment, a white pigment is preferable.

Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate, and the like; and organic pigments such as styrene pigments, acrylic pigments, urea resins, melamine resins and the like.

Among these, porous inorganic pigments are preferable, and synthetic amorphous silica whose pores have a large surface area is particularly preferable.

Either silicic anhydride obtained by a dry-type production method or a hydrated silicic acid obtained by a wet-type production method can be used as the synthetic amorphous silica. However, hydrated silicic acid is particularly preferable.

Examples of the water based binder include water soluble polymers such as polyvinyl alcohol, silanol modified polyvinyl alcohol, starch, cationic starch, casein, gelatin, carboxymethyl cellulose, hydroxyethyl cellulose, polyvinylpyrrolidone, polyalkylene oxide, polyalkylene oxide derivatives and the like; water dispersible polymers such as styrene-butadiene latex, acrylic emulsions, and the like; and the like.

One type of water based binder may be used, or two or more types may be used in combination.

Among these, polyvinyl alcohol and silanol modified polyvinyl alcohol are preferable from the standpoints of adhesion to the pigment and separation-resistance of the image-receiving layer.

The mordant is preferably immobilized, and thus, a polymer mordant is preferable.

Examples of polymer mordants are disclosed in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236, and U.S. Pat. Nos. 2,484,430, 2,548,564, 3,148,061, 3,309,690, 4,115,124, 4,124,386, 4,193,800, 4,273,853, 4,282,305, and 4,450,224. The polymer mordants disclosed on pages 212 to 215 of JP-A No. 1-161236 are suitably used. It is preferable to use these polymer mordants because images having excellent image quality are obtained and light-resistance of the images is improved.

The water-proofing agent is used for the purpose of making the images waterproof.

Cationic resins are preferable as the water-proofing agent.

Examples of the cationic resin include polyamide-polyamine epichlorohydrine, polyethyleneimine, polyaminesulfone, dimethyldiallyl ammonium chloride polymer, cationic polyacrylamide, and the like. Among these cationic resins, polyamidepolyamine epichlorohydrine is particularly preferable.

The contained amount of the cationic resin is preferably 1 to 15% by mass, and more preferably 3 to 10% by mass, with respect to the total solid content of the image-receiving layer.

Examples of the light-resistance improving agent are zinc sulfate, zinc oxide, hindered amine antioxidants, benzotriazole ultraviolet light absorbers such as benzophenone, and the like. Among these, zinc sulfate is particularly preferable.

The surfactant functions as a coating aid, a detachability improving agent, a slippage improving agent, and an anti-static agent.

Examples of the surfactants are disclosed in JP-A Nos. 62-173463 and 62-183457.

Organic fluoro compounds may be used instead of the surfactant.

It is preferable that the organic fluoro compounds are hydrophobic.

Examples of the organic fluoro compounds are fluorine based surfactants, oily fluorine-based compounds (e.g., fluorine oil), and solid fluorine based compound resins (e.g., tetrafluoroethylene resin), as well as the compounds disclosed in JP-B No. 57-9053 (columns 8 through 17), and JP-A Nos. 61-20994 and 62-135826.

Examples of other additives are pigments dispersion aids, thickeners, anti-foaming agents, dyes, fluorescent whitening agents, preservatives, pH adjusting agents, matte agents, film hardeners, and the like. The image-receiving layer may be comprised of one layer or may be comprised of two or more layers.

The thickness of the image-receiving layer is preferably from 10 to 50 $\mu$m and more preferably from 20 to 40 $\mu$m.

The backcoat layer includes a white pigment, a water based binder and other components.

Examples of the white pigments are white inorganic pigments such as light-weight calcium carbonate, heavy-weight calcium carbonate, kaolin, talc, calcium sulfate, barium sulfate, titanium dioxide, zinc oxide, zinc sulfade, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate, magnesium hydroxide, and the like; and organic pigments such as styrene based plastic pigments, acrylic based plastic pigments, polyethylene, microcapsules, urea resins, melamine resins and the like.

Examples of the water based binder include water soluble polymers such as styrene/maleate salt copolymer, styrene/acrylate salt copolymer, polyvinyl alcohol, silanol modified polyvinyl alcohol, starch, cationized starch, casein, gelatin, carboxymethyl cellulose, hydroxyethyl cellulose, polyvinylpyrrolidone, and the like; water dispersible polymers such as styrene butadiene latex, acrylic emulsion, and the like; and the like.

Examples of the other components are anti-foaming agents, foaming suppressing agents, dyes, fluorescent whitening agents, preservatives, waterproofing agents, and the like.

A polymer latex may be added to each of the layers of the recording paper and the recording film.

The polymer latex is used for the purpose of improving the film properties such as stability of dimensions, prevention of curling, prevention of adhesion, prevention of cracking of the film, and the like.

Examples of the polymer latex are those disclosed in JP-A Nos. 62-245258, 62-1316648 and 62-110066. When a polymer latex having a low glass transition temperature (of 40° C. or less) is added to a layer including the mordant, cracking and curling of the layer can be prevented. Further, by adding a polymer latex having a high glass transition temperature to the backcoat layer, curling can be prevented.

The ink for the ink jet of the present invention can be applied to any ink jet recording method. For example, the ink for the ink jet of the present invention can be suitably used in a charge control method in which ink is discharged by utilizing electrostatic attraction; a drop on demand method (pressure pulse method) utilizing the vibration pressure of a piezo element; an acoustic ink jet method in which electric signals are converted to acoustic beams, the beams are applied to the ink, and the emission pressure is utilized so as to discharge the ink; a thermal ink jet (bubble jet) method in which the ink is heated to form air bubbles and the generated pressure is utilized; and the like.

The above ink jet recording methods include a method in which plural drops of an ink, which has a low density and is called a photoink, are expelled in small volumes; a method in which image quality is improved by using plural inks having substantially the same hue and different densities; and a method utilizing a colorless, transparent ink.

EXAMPLES

Hereinafter, Examples of the present invention will be described. However, the present invention is by no means limited to the same.

Example 1

Production of Ink Set 101

8 g of a dye (M-6) and 5 g of dioctyl sulfosuccinate were dissolved at 70° C. in a mixture of 6 g of a high boiling point organic solvent (O-1), 10 g of a high boiling point organic solvent (O-2), 6.0 g of a mixture of Uv1 to UV3 (weight ratio=1:1:1), and 50 ml of ethyl acetate. 500 ml of deionized water was added to this solution while stirring with a magnetic stirrer to produce an oil-in-water type coarse dispersion.

Next, the coarse dispersion was passed five times through MICROFLUIDIZER (MICROFLUIDEX INC) at a pressure of 60 MPa (600 bar) to obtain fine particles. Further, the obtained emulsion was desolvated by a rotary evaporator until an odor of the ethyl acetate disappeared.

Additives such as 140 g of diethylene glycol, 64 g of glycerin, 7 g of SURFYNOL 465 (Air Products & Chemicals), urea and the like were added to the fine emulsion of the oil-soluble dye obtained in the above manner, and thereafter, 900 ml of deionized water was added thereto. The PH thereof was adjusted to 9 using 10 mol/1 of KOH. As a result, a light magenta ink in accordance with the following Table 1 was produced. When the volume average particle size of the obtained emulsion dispersed ink was measured using MICROTRACK UPA (Nikkiso Co., Ltd.), the obtained size was 51 nm.

Further, the type of dye and the amount of the high boiling point organic solvents to be used were changed to produce a magenta ink, a light cyan ink, a cyan ink, a yellow ink and a black ink of Ink Set 101 shown in Table 1.

TABLE 1

|  | Light Magenta | Magenta | Light Cyan | Cyan | Yellow | Black |
|---|---|---|---|---|---|---|
| Dye | M-6 | M-6 | C-1 | C-1 | Y-1 | M-6 |
|  | 5.00 g/l | 20.0 | 9.3 | 37.2 | 27.2 | 10.0 |
|  |  |  |  |  |  | C-1 |
|  |  |  |  |  |  | 18.6 |
|  |  |  |  |  |  | Y-1 |
|  |  |  |  |  |  | 13.6 |
| High Boiling Point | O-1 3.63 | 14.52 | 6.75 | 27.0 | 19.74 | 30.6 |
| Organic Solvents | O-2 6.38 | 25.52 | 11.9 | 47.6 | 34.7 | 53.8 |
| Ultraviolet Light Absorber (Mixture of UV-1/2/3 = 1:1:1) | 4.50 | 14.5 | 9.05 | 37.8 | 26.7 | 52.4 |
| Dioctyl Sodium Sulfosuccinate | 6.25 | 25.0 | 11.6 | 46.4 | 34.0 | 52.7 |
| Diethylene Glycol | 110.0 | 110.0 | 110.0 | 110.0 | 110.0 | 110.0 |
| Urea | 46.0 | 46.0 | 46.0 | 46.0 | 46.0 | 46.0 |
| Glycerin | 50.0 | 50.0 | 50.0 | 50.0 | 50.0 | 50.0 |
| SURFYNOL 465 | 5.5 | 5.5 | 5.5 | 5.5 | 5.5 | 5.5 |
| Triethanolamine | 7.5 | 7.5 | 7.5 | 7.5 | 7.5 | 7.5 |
| Benzotriazole | 0.075 | 0.075 | 0.075 | 0.075 | 0.075 | 0.075 |
| Proxel XL2 | 2.5 | 2.5 | 2.5 | 2.5 | 2.5 | 2.5 |

Deionized water was added to the above components so that the total amount was 1 liter.

| Volume Average Particle Size | 51 nm | 53 | 62 | 65 | 59 | 70 |

M-6

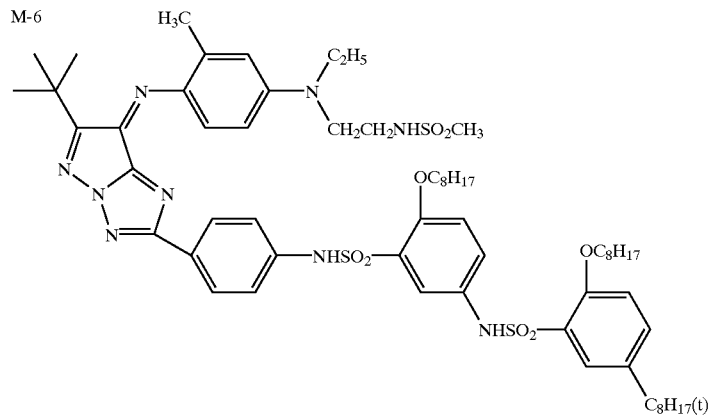

TABLE 1-continued
C-1
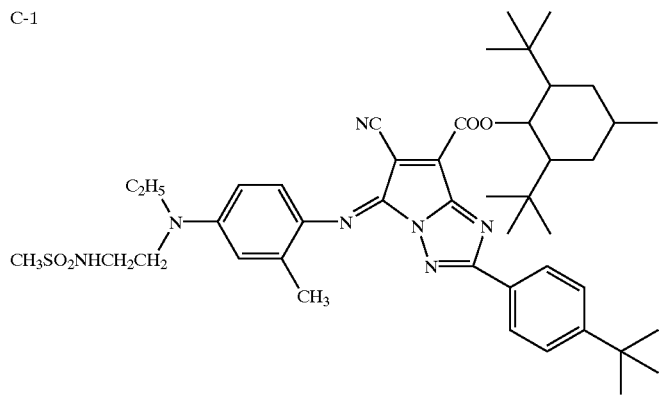
Y-1
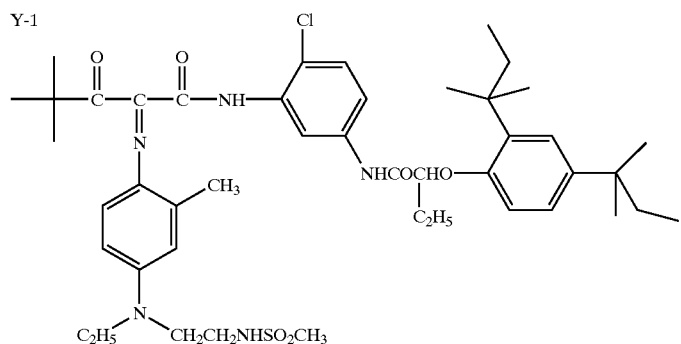
UV-1
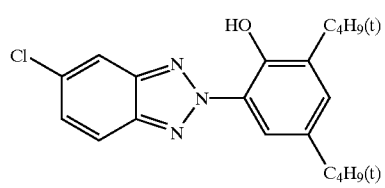
UV-2
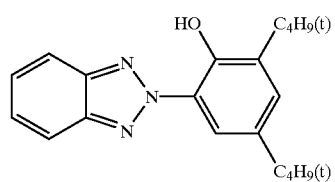
UV-3
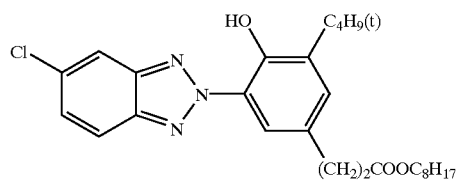
O-1
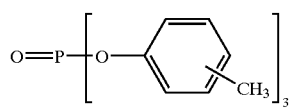

TABLE 1-continued

O-2

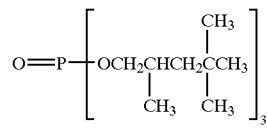

Next, Ink Sets 102 to 131 were produced in the same manner as in Ink Set 101 except that the dye was changed to the dyes shown in Table 2 so that each of them is included in an equimolar amount (when a combination of two types of inks is used in the same color ink, each of them is used in 0.5 molar amount), and/or that the compound of the present invention (the carbon-carbon unsaturated bond containing compound) was added in a molar amount which is equal to the amount of the dyes.

Further, Ink Set 125 for comparison was produced, in which the volume average particle size was changed by changing the pressure during emulsification.

Furthermore, Ink Set 132 in accordance with Table 3 was produced as an ink set for comparison, which used water-soluble dyes.

Moreover, Ink Sets 133 and 134 were produced by using the dyes and the compound of the present invention used in Ink Sets 102 and 103, in place of the dyes used in Ink Set 132 for comparison, respectively. In Ink Sets 133 and 134, the dyes were added in the same molar amount as in Ink Set 132, and the ratio of the dyes to the compound of the present invention was the same as in Ink Sets 102 and 103.

TABLE 2

| Ink Set | | Light Magenta | Magenta | Light Cyan | Cyan | Yellow | Black | Remarks |
|---|---|---|---|---|---|---|---|---|
| 101 | Dye | M-6 5.0 g/l | M-6 20.0 | C-1 9.3 | C-1 37.2 | Y-1 27.2 | M-6 10.0, C-1 18.6, Y-1 13.6 | |
| | Compound of the Present Invention | — | — | — | — | — | — | Comparative Example |
| | Volume Particle Size | 51 nm | 53 | 62 | 65 | 59 | 70 | |
| 102 | Dye | M-6 | M-6 | C-1 | C-1 | Y-1 | M-6 C-1 Y-1 | |
| | Compound of the Present Invention | S-1 | S-1 | S-1 | S-1 | S-1 | S-1 | Present Invention |
| | Volume Particle Size | 53 nm | 50 | 63 | 65 | 55 | 60 | |
| 103 | Dye | M-6 | M-6 | C-1 | C-1 | Y-1 | M-6 C-1 Y-1 | |
| | Compound of the Present Invention | S-2 | S-2 | S-2 | S-2 | S-2 | S-2 | Present Invention |
| | Volume Particle Size | 53 nm | 50 | 63 | 65 | 55 | 60 | |
| 104 | Dye | M-6 | M-6 | C-1 | C-1 | Y-1 | M-6 C-1 Y-1 | |
| | Compound of the Present Invention | S-20 | S-20 | S-20 | S-20 | S-20 | S-20 | Present Invention |
| | Volume Particle Size | 53 nm | 50 | 63 | 65 | 55 | 60 | |
| 105 | Dye | M-6 | M-6 | C-1 | C-1 | Y-1 | M-6 C-1 Y-1 | |
| | Compound of the Present Invention | S-32 | S-32 | S-32 | S-32 | S-32 | S-32 | Present Invention |
| | Volume Particle Size | 53 nm | 50 | 63 | 65 | 55 | 60 | |
| 106 | Dye | M-6 | M-6 | C-1 | C-1 | Y-1 | M-6 C-1 Y-1 | |
| | Compound of the Present Invention | S-46 | S-46 | S-46 | S-46 | S-46 | S-46 | Present Invention |
| | Volume Particle Size | 53 nm | 50 | 63 | 65 | 55 | 60 | |
| 107 | Dye | M-6/M-9 | M-6/M-7 | C-1/C-4 | C-1/C-4 | Y-1 | M-15 C-1 Y-1 | |
| | Compound of the Present Invention | S-64 | S-64 | S-64 | S-64 | S-64 | S-64 | Present Invention |
| | Volume Particle Size | 53 nm | 50 | 63 | 65 | 55 | 60 | |
| 108 | Dye | M-1/M-4 | M-1/M-10 | C-2/C-6 | C-2/C-6 | Y-1 | M-15 C-1 Y-1 | |
| | Compound of the Present Invention | S-80 | S-80 | S-80 | S-80 | S-80 | S-80 | Present Invention |
| | Volume Particle Size | 53 nm | 50 | 63 | 65 | 55 | 60 | |
| 109 | Dye | M-6 | M-6 | C-1 | C-1 | Y-1 | M-6 C-1 Y-1 | |
| | Compound of the Present Invention | S-90 | S-95 | S-96 | S-90 | S-90 | S-3 | Present Invention |
| | Volume Particle Size | 53 nm | 50 | 63 | 65 | 55 | 60 | |
| 110 | Dye | M-6 | M-6 | C-1 | C-1 | Y-1 | M-6 C-1 Y-1 | |
| | Compound of the Present Invention | S-109 | S-110 | S-112 | S-109 | S-101 | S-35 | Present Invention |
| | Volume Particle Size | 53 nm | 50 | 63 | 65 | 55 | 60 | |
| 111 | Dye | M-6 | M-6 | C-1 | C-1 | Y-1 | M-6 C-1 Y-1 | |
| | Compound of the Present Invention | S-123 | S-123 | S-123 | S-123 | S-123 | S-123 | Present Invention |
| | Volume Particle Size | 53 nm | 50 | 63 | 65 | 55 | 60 | |

TABLE 2-continued

| Ink Set | | Light Magenta | Magenta | Light Cyan | Cyan | Yellow | Black | Remarks |
|---|---|---|---|---|---|---|---|---|
| 112 | Dye | M-3/M-7 | M-3/M-7 | C-3/C-8 | C-3/C-8 | Y-1 | M-6 C-1 Y-1 | |
| | Compound of the Present Invention | S-116 | S-116 | S-116 | S-116 | S-116 | S-116 | Present Invention |
| | Volume Particle Size | 53 nm | 50 | 63 | 65 | 55 | 60 | |
| 113 | Dye | M-6 | M-6 | C-1 | C-1 | Y-1 | M-6 C-1 Y-1 | |
| | Compound of the Present Invention | S-131 | S-131 | S-131 | S-131 | S-131 | S-131 | Present Invention |
| | Volume Particle Size | 53 nm | 50 | 63 | 65 | 55 | 60 | |
| 114 | Dye | M-6 | M-6 | C-1 | C-1 | Y-1 | M-6 C-1 Y-1 | |
| | Compound of the Present Invention | S-140 | S-140 | S-140 | S-140 | S-140 | S-140 | Present Invention |
| | Volume Particle Size | 53 nm | 50 | 63 | 65 | 55 | 60 | |
| 115 | Dye | M-6 | M-6 | C-1 | C-1 | Y-1 | M-6 C-1 Y-1 | |
| | Compound of the Present Invention | S-152 | S-152 | S-152 | S-152 | S-152 | S-152 | Present Invention |
| | Volume Particle Size | 53 nm | 50 | 63 | 65 | 55 | 60 | |
| 116 | Dye | MM-1 5.0 g/l | MM-1 20.0 | CC-1 9.3 | CC-1 37.2 | Y-1 27.2 | MM-1 10.0, CC-1 18.6, Y-1 13.6 | |
| | Compound of the Present Invention | — | — | — | — | — | — | Comparative Example |
| | Volume Particle Size | 53 nm | 50 | 63 | 65 | 55 | 60 | |
| 117 | Dye | MM-1 5.0 g/l | MM-1 20.0 | CC-1 9.3 | CC-1 37.2 | Y-1 27.2 | MM-1 10.0, CC-1 18.6, Y-1 13.6 | |
| | Compound of the Present Invention | S-20 | S-20 | S-20 | S-20 | S-20 | S-20 | Present Invention |
| | Volume Particle Size | 53 nm | 50 | 63 | 65 | 55 | 60 | |
| 118 | Dye | MM-1 | MM-1 | CC-1 | CC-1 | Y-1 | MM-1 CC-1 Y-1 | |
| | Compound of the Present Invention | S-1 | S-1 | S-1 | S-1 | S-1 | S-1 | Present Invention |
| | Volume Particle Size | 53 nm | 50 | 63 | 65 | 55 | 60 | |
| 119 | Dye | MM-1 | MM-1 | CC-1 | CC-1 | Y-1 | MM-1 CC-1 Y-1 | |
| | Compound of the Present Invention | S-2 | S-2 | S-2 | S-2 | S-2 | S-2 | Present Invention |
| | Volume Particle Size | 53 nm | 50 | 63 | 65 | 55 | 60 | |
| 120 | Dye | MM-2 5.0 g/l | MM-2 20.0 | CC-2 9.3 | CC-2 37.2 | YY-2 27.2 | MM-2 10.0, CC-2 18.6, YY-2 13.6 | |
| | Compound of the Present Invention | — | — | — | — | — | — | Comparative Example |
| | Volume Particle Size | 53 nm | 50 | 63 | 65 | 55 | 60 | |
| 121 | Dye | MM-2 | MM-2 | CC-2 | CC-2 | YY-2 | MM-2 CC-2 YY-2 | |
| | Compound of the Present Invention | S-5 | S-5 | S-5 | S-5 | S-5 | S-5 | Present Invention |
| | Volume Particle Size | 53 nm | 50 | 63 | 65 | 55 | 60 | |
| 122 | Dye | MM-2 | MM-2 | CC-2 | CC-2 | YY-2 | MM-2 CC-2 YY-2 | |
| | Compound of the Present Invention | S-17 | S-17 | S-17 | S-17 | S-17 | S-17 | Present Invention |
| | Volume Particle Size | 53 nm | 50 | 63 | 65 | 55 | 60 | |
| 123 | Dye | MM-2 | MM-2 | CC-2 | CC-2 | YY-2 | MM-2 CC-2 YY-2 | |
| | Compound of the Present Invention | S-28 | S-28 | S-28 | S-18 | S-28 | S-28 | Present Invention |
| | Volume Particle Size | 53 nm | 50 | 63 | 65 | 55 | 60 | |
| 124 | Dye | MM-2 | MM-2 | CC-2 | CC-2 | YY-2 | MM-2 CC-2 YY-2 | |
| | Compound of the Present Invention | S-38 | S-38 | S-38 | S-38 | S-38 | S-38 | Present Invention |
| | Volume Particle Size | 53 nm | 50 | 63 | 65 | 55 | 60 | |
| 125 | Dye | M-15 5.0 g/l | M-15 20.0 | C-1 9.3 | C-1 37.2 | YY-1 27.2 | M-15 10.0, C-1 18.6, YY-1 13.6 | |
| | Compound of the Present Invention | — | — | — | — | — | — | Comparative Example |
| | Volume Particle Size | 300 nm | 310 | 300 | 300 | 300 | 300 | |
| 126 | Dye | M-6 | M-6 | C-1 | C-1 | Y-1 | M-6 C-1 Y-1 | |
| | Compound of the Present Invention | S-161 | S-161 | S-161 | S-161 | S-161 | S-161 | Present Invention |
| | Volume Particle Size | 53 nm | 50 | 63 | 65 | 55 | 60 | |
| 127 | Dye | M-6 | M-6 | C-1 | C-1 | Y-1 | M-6 C-1 Y-1 | |
| | Compound of the Present Invention | S-166 | S-166 | S-166 | S-166 | S-166 | S-166 | Present Invention |
| | Volume Particle Size | 53 nm | 50 | 63 | 65 | 55 | 60 | |
| 128 | Dye | M-6 | M-6 | C-1 | C-1 | Y-1 | M-6 C-1 Y-1 | |
| | Compound of the Present Invention | S-178 | S-178 | S-178 | S-178 | S-178 | S-178 | Present Invention |
| | Volume Particle Size | 53 nm | 50 | 63 | 65 | 55 | 60 | |
| 129 | Dye | M-6 | M-6 | C-1 | C-1 | Y-1 | M-6 C-1 Y-1 | |
| | Compound of the Present Invention | S-180 | S-180 | S-180 | S-180 | S-180 | S-180 | Present Invention |
| | Volume Particle Size | 53 nm | 50 | 63 | 65 | 55 | 60 | |
| 130 | Dye | M-6 | M-6 | C-1 | C-1 | Y-1 | M-6 C-1 Y-1 | |
| | Compound of the Present Invention | S-201 | S-201 | S-201 | S-201 | S-201 | S-201 | Present Invention |
| | Volume Particle Size | 53 nm | 50 | 63 | 65 | 55 | 60 | |

TABLE 2-continued
| Ink Set | | Light Magenta | Magenta | Light Cyan | Cyan | Yellow | Black | Remarks |
|---|---|---|---|---|---|---|---|---|
| 131 | Dye | M-6 | M-6 | C-1 | C-1 | Y-1 | M-6 C-1 Y-1 | |
| | Compound of the Present Invention | S-210 | S-210 | S-210 | S-201 | S-210 | S-201 | Present Invention |
| | Volume Particle Size | 53 nm | 50 | 63 | 65 | 55 | 60 | |
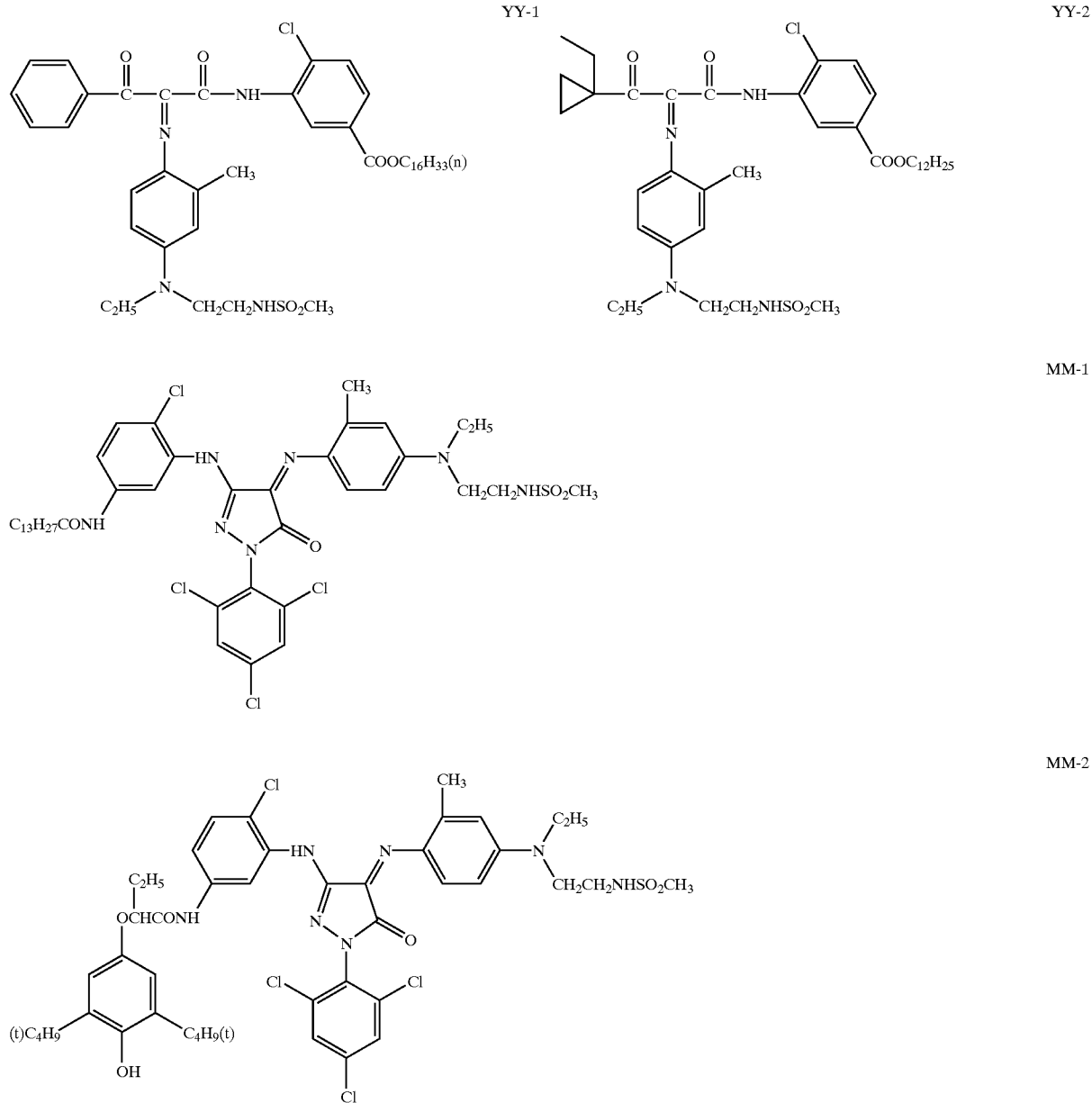

-continued

CC-1
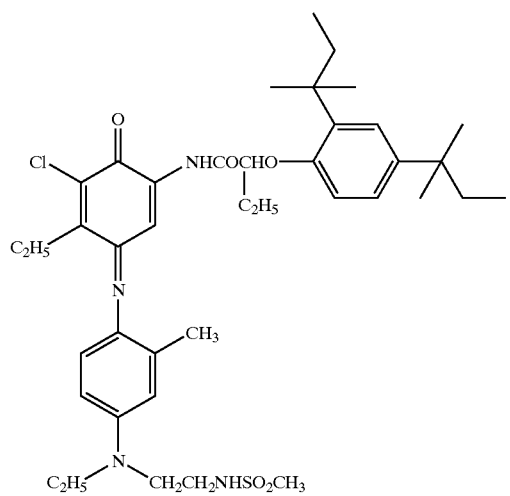

CC-2
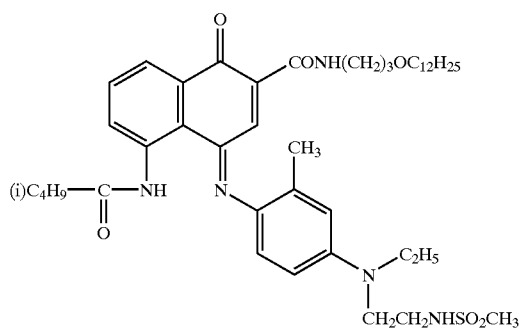

TABLE 3

|  | Light Magenta | Magenta | Light Cyan | Cyan | Yellow | Black |
|---|---|---|---|---|---|---|
| Dye | A-1 | A-1 | A-2 | A-2 | A-3 | A-5 |
|  | 7.0 g/l | 28.0 | 8.75 | 35.0 | 14.7 | 20.0 |
|  |  |  |  |  | A-4 | A-6 |
|  |  |  |  |  | 14.0 | 20.0 |
|  |  |  |  |  |  | A-7 |
|  |  |  |  |  |  | 20.0 |
|  |  |  |  |  |  | A-3 |
|  |  |  |  |  |  | 21.0 |
| Diethylene Glycol | 150 | 110 | 130 | 200 | 160 | 20 |
| Urea | 37 | 46 | — | — | — | — |
| Glycerin | 130 | 130 | 150 | 180 | 150 | 120 |
| Triethylene Glycol Monobutyl Ether | 130 | 140 | 130 | 140 | 130 | — |
| Diethylene Glycol Monobutyl Ether | — | — | — | — | — | 230 |
| 2-pyrolidone | — | — | — | — | — | 80 |
| SURFYNOL 465 | 10.5 | 11.5 | 11.1 | 9.8 | — | — |
| SURFYNOL TG | — | — | — | — | 9.0 | 8.5 |
| Triethanolamine | 6.9 | 7.4 | 6.8 | 6.7 | 0.8 | 17.9 |
| Benzotriazole | 0.08 | 0.07 | 0.08 | 0.08 | 0.06 | 0.06 |
| Proxel XL2 | 3.5 | 2.5 | 1.8 | 2.0 | 2.5 | 1.8 |

Deionized water was added to the above components so that the total amount was 1 liter.

A-1

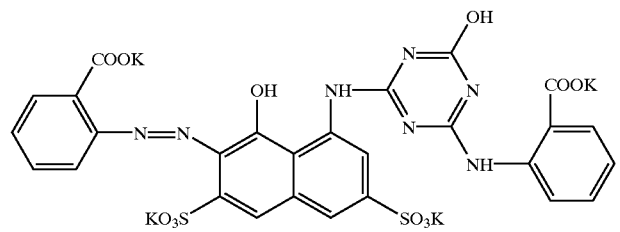

TABLE 3-continued
A-2
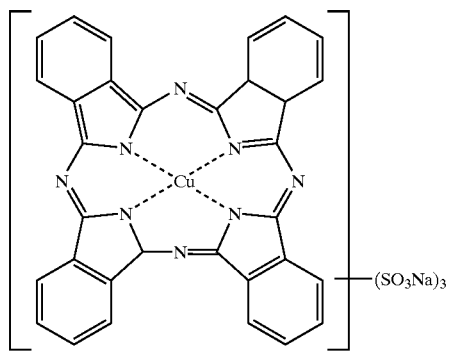
A-3
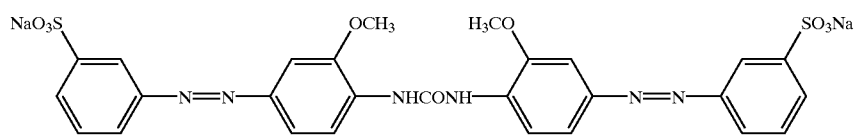
A-4
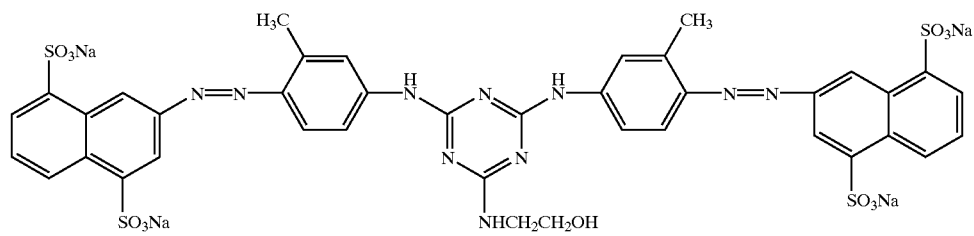
A-5
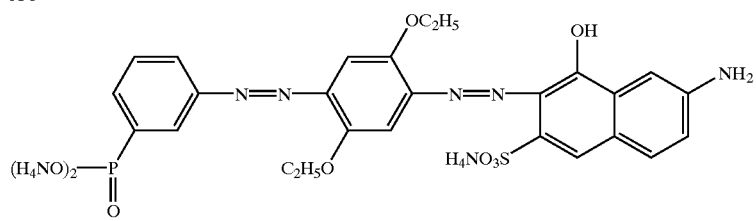
A-6
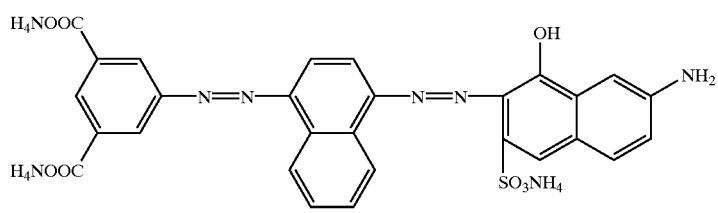
A-7
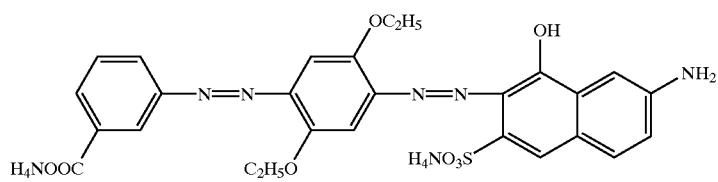

Next, these Ink Sets 101 to 134 were filled into a cartridge of an ink jet printer, PM670C (manufactured by EPSON), images were printed on ink jet paper, photo gloss paper EX manufactured by Fuji Photo Film Co., Ltd., using the same printer, and the following evaluations were conducted.

1) In evaluation of printing performance (1), the cartridge was set in the printer, discharge of an ink from all nozzles was confirmed, and thereafter, images were output on 20 sheets of A4 paper and turbulence of printing was evaluated.

A: Turbulence was not occurred from beginning to end of printing.

B: Some outputs with turbulence were occurred.

C: Turbulence was occurred from beginning to end of printing.

2) In evaluation of printing performance (2), the cartridge was left at 60° C. for 2 days, and thereafter, turbulence of printing was evaluated in the same manner as in evaluation of printing performance (1).

3) In evaluation of drying property, dirt generated when the image was touched with a finger immediately after printing was visually evaluated.

4) In evaluation of bleeding of thin lines, thin line patterns of yellow, magenta, cyan and black were printed and bleeding was visually evaluated (evaluation of bleeding of thin lines (1)). Further, for black, a magenta ink was printed in a solid condition, and then thin lines of black were printed, and bleeding due to contact of the two colors was evaluated (evaluation of bleeding of thin lines (2)).

5) In evaluation of water resistance, the obtained image was immersed in deionized water for 10 seconds, and thereafter, bleeding of the image was evaluated.

6) In evaluation of image preservability (dark heat preservability), print samples of yellow, magenta, cyan and black were produced, and evaluated as follows.

The color density of the samples was measured before and after being preserved for 14 days under a condition of 80° C. and 15% RH, and the ratio was calculated as a fading ratio (%) in the following manner: fading ratio=(density after being left for 14 days at 80°C. and 15% RH) /density immediately after being printed x 100.

The obtained results are shown in Tables 4 and 5.

TABLE 4

| Ink Set | Printing Performance (1) | Printing Performance (2) | Drying Property | Bleeding Of Thin Lines (1) | Bleeding of Thin Lines (2) | Water Resistance | Remarks |
|---|---|---|---|---|---|---|---|
| 101 | A | A | ○ | ○ | ○ | ○ | Comparative Example |
| 102 | A | A | ○ | ○ | ○ | ○ | Present Invention |
| 103 | A | A | ○ | ○ | ○ | ○ | Present Invention |
| 104 | A | A | ○ | ○ | ○ | ○ | Present Invention |
| 105 | A | A | ○ | ○ | ○ | ○ | Present Invention |
| 106 | A | A | ○ | ○ | ○ | ○ | Present Invention |
| 107 | A | A | ○ | ○ | ○ | ○ | Present Invention |
| 108 | A | B | ○ | ○ | ○ | ○ | Present Invention |
| 109 | A | B | ○ | ○ | ○ | ○ | Present Invention |
| 110 | A | B | ○ | ○ | ○ | ○ | Present Invention |
| 111 | A | B | ○ | ○ | ○ | ○ | Present Invention |
| 112 | A | B | ○ | ○ | ○ | ○ | Present Invention |
| 113 | A | B | ○ | ○ | ○ | ○ | Present Invention |
| 114 | A | B | ○ | ○ | ○ | ○ | Present Invention |
| 115 | A | B | ○ | ○ | ○ | ○ | Present Invention |
| 116 | A | B | ○ | ○ | ○ | ○ | Comparative Example |
| 117 | A | B | ○ | ○ | ○ | ○ | Present Invention |
| 118 | A | B | ○ | ○ | ○ | ○ | Present Invention |
| 119 | A | B | ○ | ○ | ○ | ○ | Present Invention |
| 120 | A | B | ○ | ○ | ○ | ○ | Comparative Example |
| 121 | A | B | ○ | ○ | ○ | ○ | Present Invention |
| 122 | A | B | ○ | ○ | ○ | ○ | Present Invention |
| 123 | A | B | ○ | ○ | ○ | ○ | Present Invention |

TABLE 4-continued

| Ink Set | Printing Performance (1) | Printing Performance (2) | Drying Property | Bleeding Of Thin Lines (1) | Bleeding of Thin Lines (2) | Water Resistance | Remarks |
|---|---|---|---|---|---|---|---|
| 124 | A | B | ○ | ○ | ○ | ○ | Present Invention |
| 125 | C | C | ○ | ○ | ○ | ○ | Comparative Example |
| 126 | A | B | ○ | ○ | ○ | ○ | Present Invention |
| 127 | A | B | ○ | ○ | ○ | ○ | Present Invention |
| 128 | A | B | ○ | ○ | ○ | ○ | Present Invention |
| 129 | A | B | ○ | ○ | ○ | ○ | Present Invention |
| 130 | A | B | ○ | ○ | ○ | ○ | Present Invention |
| 131 | A | B | ○ | ○ | ○ | ○ | Present Invention |
| 132 | A | A | X | X | X | X | Comparative Example |
| 133 | A | B | ○ | ○ | ○ | ○ | Present Invention |
| 134 | A | B | ○ | ○ | ○ | ○ | Present Invention |

TABLE 5

| Ink Set | Fading Rate (%) | | | | Remarks |
|---|---|---|---|---|---|
|  | Y | M | C | BK |  |
| 101 | 68.8 | 51.1 | 32.8 | 48.8 | Comparative Example |
| 102 | 91.1 | 83.8 | 78.8 | 85.5 | Present Invention |
| 103 | 90.2 | 84.4 | 79.9 | 83.1 | Present Invention |
| 104 | 89.9 | 82.6 | 81.8 | 83.5 | Present Invention |
| 105 | 88.8 | 81.8 | 82.1 | 83.1 | Present Invention |
| 106 | 88.8 | 82.4 | 81.9 | 81.6 | Present Invention |
| 107 | 88.8 | 80.4 | 78.8 | 76.8 | Present Invention |
| 108 | 87.8 | 79.9 | 76.8 | 80.5 | Present Invention |
| 109 | 82.1 | 79.8 | 71.4 | 79.8 | Present Invention |
| 110 | 81.9 | 80.1 | 72.2 | 79.9 | Present Invention |
| 111 | 80.6 | 78.5 | 71.8 | 78.8 | Present Invention |
| 112 | 81.1 | 78.2 | 72.4 | 73.1 | Present Invention |
| 113 | 78.8 | 70.4 | 71.1 | 70.2 | Present Invention |
| 114 | 76.6 | 70.0 | 70.2 | 71.5 | Present Invention |
| 115 | 88.8 | 69.9 | 70.1 | 71.9 | Present Invention |
| 116 | 67.5 | 41.8 | 44.4 | 41.8 | Comparative Example |
| 117 | 88.9 | 76.6 | 71.1 | 77.4 | Present Invention |
| 118 | 88.1 | 75.9 | 71.2 | 76.5 | Present Invention |
| 119 | 88.1 | 74.4 | 70.8 | 75.5 | Present Invention |
| 120 | 48.8 | 40.2 | 50.8 | 51.1 | Comparative Example |
| 121 | 70.8 | 73.5 | 69.9 | 71.5 | Present Invention |
| 122 | 70.9 | 73.8 | 70.1 | 71.5 | Present Invention |
| 123 | 70.2 | 71.1 | 68.4 | 70.1 | Present Invention |
| 124 | 70.9 | 70.8 | 98.2 | 69.9 | Present Invention |
| 125 | 68.9 | 50.9 | 31.8 | 47.7 | Comparative Example |
| 126 | 75.5 | 71.1 | 69.7 | 70.1 | Present Invention |
| 127 | 74.5 | 72.2 | 69.5 | 69.9 | Present Invention |
| 128 | 74.1 | 71.9 | 70.2 | 70.1 | Present Invention |
| 129 | 73.8 | 72.0 | 71.1 | 70.2 | Present Invention |
| 130 | 73.1 | 71.9 | 70.9 | 71.1 | Present Invention |
| 131 | 74.1 | 70.9 | 70.1 | 70.1 | Present Invention |
| 132 | 67.7 | 50.9 | 33.1 | 49.2 | Comparative Example |
| 133 | 88.1 | 80.2 | 76.4 | 83.1 | Present Invention |
| 134 | 87.9 | 81.2 | 76.1 | 82.1 | Present Invention |

It was found that, when the ink for the ink jet of the present invention was used, excellent printing performance was able to be obtained, and excellent water resistance and fastness were also exhibited. Further, when the ink for the ink jet of the present invention was used, it was advantageous that the thin lines were able to be output without bleeding.

Furthermore, when a compound having a structure of M-6 was used as a magenta pigment and a compound having a structure of C-1 was used as a cyan pigment, particularly remarkable improved effects were observed.

Example 2

The same inks as produced in Example 1 were filled into a cartridge of an ink jet printer, BJ-F850 (manufactured by CANON), images were printed on ink jet paper, photo gloss paper EX manufactured by Fuji Photo Film Co., Ltd., using the same printer, and the same evaluations as in Example 1 were conducted. As a result, the same results as in Example 1 were obtained.

What is claimed is:

1. An ink for an ink jet, the ink being formed by dispersing in a water-based medium an oil-soluble dye that is dissolved in a high boiling point organic solvent, with the ink containing a compound having in a molecule at least one carbon-carbon unsaturated bond that is different from a phenyl group, wherein the compound having in a molecule at least one carbon-carbon unsaturated bond that is different from a phenyl group is at least one of the compounds represented by the following general formulae (A) to (H):

General formula (A)

General formula (B)

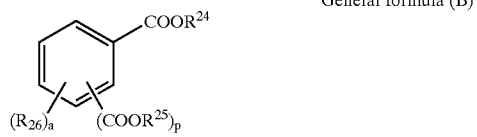

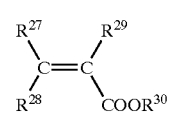
General formula (C)

General formula (D)

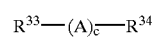
General formula (E)

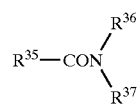
General formula (F)

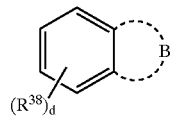
General formula (G)

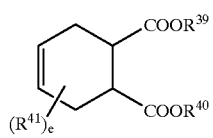
General formula (H)

wherein $R^{21}$, $R^{24}$, $R^{32}$ and $R^{33}$ each independently represents an alkenyl group or an alkynyl group having 2 to 40 carbon atoms;

$R^{22}$, $R^{23}$, $R^{25}$, $R^{27}$, $R^{28}$, $R^{29}$, $R^{30}$, $R^{34}$, $R^{35}$, $R^{36}$, $R^{37}$, $R^{39}$ and $R^{40}$ each independently represents a hydrogen atom, an aliphatic group having 1 to 40 carbon atoms, an aryl group having 6 to 40 carbon atoms, or a heterocyclic group having 1 to 40 carbon atoms;

at least one of $R^{35}$, $R^{36}$ and $R^{37}$ represents an alkenyl group or an alkynyl group having 2 to 40 carbon atoms;

$R^{26}$, $R^{38}$ and $R^{41}$ each represents a substituent;

A represents an oxygen atom or a sulfur atom, and B represents a non-metallic atom group which forms an unsaturated ring;

a represents an integer of 0 to 4, p represents 0 or 1, b represents an integer of 1 to 4, c represents 0 or 1, d represents an integer of 0 to 4, and e represents an integer of 0 to 6;

when b represents 1, $R^{31}$ represents an aliphatic group having 1 to 40 carbon atoms, an aryl group having 6 to 40 carbon atoms, or a heterocyclic group having 1 to 40 carbon atoms; and when b represents an integer of 2 to 4, $R^{31}$ represents an aliphatic group having 1 to 20 carbon atoms each having a valence of b;

when a, b, d and e each represents an integer of 2 or more, a plurality of $R^{26}$, —$COOR^{32}$, $R^{38}$ and $R^{41}$ may be the same or different from each other, respectively; and $R^{21}$ and $R^{22}$, and $R^{21}$ and $R^{23}$ in the general formula (A); $R^{24}$ and $R^{25}$, $R^{24}$ and $R^{26}$, and $R^{26}$ and $R^{26}$ in the general formula (B); $R^{27}$ and $R^{28}$, $R^{27}$ and $R^{29}$, $R^{27}$ and $R^{30}$, and $R^{29}$ and $R^{30}$ in the general formula (C); $R^{31}$ and $R^{32}$, and $R^{32}$ and $R^{32}$ in the general formula (D); $R^{33}$ and $R^{34}$ in the general formula (E); $R^{35}$ and $R^{36}$, and $R^{36}$ and $R^{37}$ in the general formula (F); $R^{38}$ and $R^{38}$, and $R^{38}$ and B in the general formula (G); and $R^{39}$ and $R^{40}$, $R^{40}$ and $R^{41}$, and $R^{41}$and $R^{41}$ in the general formula (H) may respectively bond each other to form a ring.

2. An ink for an ink jet according to claim 1, wherein, in said general formulae (A) to (H), $R^{21}$, $R^{24}$, $R^{32}$ and $R^{33}$ each independently represents an alkenyl group having 2 to 40 carbon atoms; $R^{22}$, $R^{23}$, $R^{25}$, $R^{27}$, $R^{28}$, $R^{29}$, $R^{30}$, $R^{34}$, $R^{35}$, $R^{36}$, $R^{37}$, $R^{39}$ and $R^{40}$ each independently represents a hydrogen atom or an aliphatic group having 1 to 40 carbon atoms; and $R^{26}$, $R^{38}$ and $R^{41}$ each independently represents an aliphatic group having 1 to 30 carbon atoms, an aryl group having 6 to 36 carbon atoms, an alkoxy group having 1 to 30 carbon atoms, a halogen atom, a carbamoyl group having 1 to 30 carbon atoms, an acylamino group having 1 to 30 carbon atoms, an acyloxy group or an aliphatic oxycarbonyl group.

3. An ink for an ink jet according to claim 1, wherein said oil-soluble dye is represented by the following general formula (I):

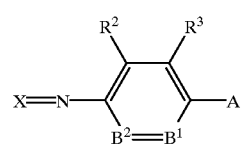
General formula (I)

wherein, X represents a residue of a color photo coupler;

A represents —$NR^4R^5$ or a hydroxy group;

$R^4$ and $R^5$ each independently represents a hydrogen atom, an aliphatic group, an aromatic group or a heterocyclic group;

$B^1$ represents =$C(R^6)$— or =N—, and $B^2$ represents —$C(R^7)$= or —N=;

$R^2$, $R^3$, $R^6$ and $R^7$ each independently represents a hydrogen atom, a halogen atom, an aliphatic group, an aromatic group, a heterocyclic group, a cyano, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$ or —$NR^{70}SO_2R^{71}$;

$R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group; and $R^2$ and $R^3$, $R^3$ and $R^4$, $R^4$ and $R^5$, $R^5$ and $R^6$, and $R^6$ and $R^7$ may respectively bond each other to form a ring.

4. An ink for an ink jet according to claim 3, wherein the oil-soluble dye represented by said general formula (I) is a compound represented by the following general formula (II):

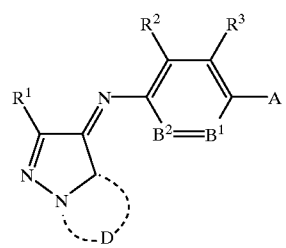
General formula (II)

wherein, $R^2$, $R^3$, A, $B^1$ and $B^2$ are synonymous with those of said general formula (I), respectively;

$R^1$ represents a hydrogen atom, an aliphatic group, an aromatic group, a heterocyclic group, a cyano group, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —N²²CONR²³R²⁴, —NR²⁵CO₂R²⁶, —COR²⁷, —NR²⁸COR²⁹ or —NR³⁰SO₂R³¹;

R¹¹, R¹², R¹³, R¹⁴, R¹⁵, R¹⁶, R¹⁷, R¹⁸, R¹⁹, R²⁰, R²¹, R²², R²³, R²⁴, R²⁵, R²⁶, R²⁷, R²⁸, R²⁹, R³⁰ and R³¹ each independently represents a hydrogen atom, an aliphatic group or an aromatic group;

D represents an atom group which forms a five-member or six-member nitrogen containing heterocyclic ring, which may be substituted for at least one of an aliphatic group, an aromatic group, a heterocyclic group, a cyano group, —OR⁸¹, —SR⁸², —CO₂R⁸³, —OCOR⁸⁴, —NR⁸⁵R⁸⁶, —CONR⁸⁷R⁸⁸, —SO₂R⁸⁹, —SO₂NR⁹⁰R⁹¹, —NR⁹²CONR⁹³R⁹⁴, —NR⁹⁵CO₂R⁹⁶, —COR⁹⁷, —NR⁹⁸COR⁹⁹ and —NR¹⁰⁰SO₂R¹⁰¹;

the heterocyclic ring may further form a condensed ring with another ring; and

R⁸¹, R⁸², R⁸³, R⁸⁴, R⁸⁵, R⁸⁶, R⁸⁷, R⁸⁸, R⁸⁹, R⁹⁰, R⁹¹, R⁹², R⁹³, R⁹⁴, R⁹⁵, R⁹⁶, R⁹⁷, R⁹⁸, R⁹⁹, R¹⁰⁰ and R¹⁰¹ each independently represents a hydrogen atom, an aliphatic group or an aromatic group.

5. An ink for an ink jet according to claim 4, wherein the compound represented by said general formula (II) is a compound represented by the following general formula (III):

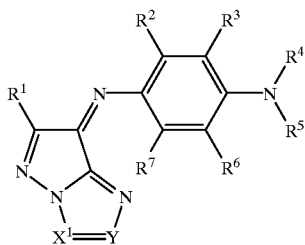

General formula (III)

wherein, R¹, R², R³, R⁴, R⁵, R⁶ and R⁷ are synonymous with those of said general formula (II), respectively;

X¹ and Y each independently represents —C(R⁸)= or —N=;

R⁸ represents a hydrogen atom, an aliphatic group or an aromatic group; and one of X¹ and Y always represents —N=, and X¹ and Y represent —N= at different times each other.

6. An ink for an ink jet according to claim 3, wherein the oil-soluble dye represented by said general formula (I) is at least one of the compounds represented by the following formulae (IV-1) to (IV-4):

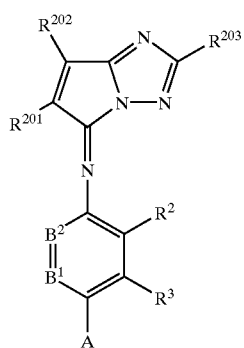

(IV-1)

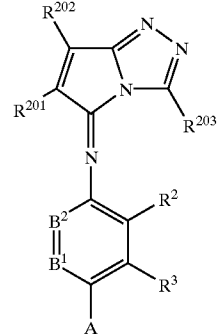

(IV-2)

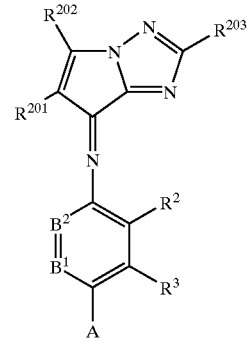

(IV-3)

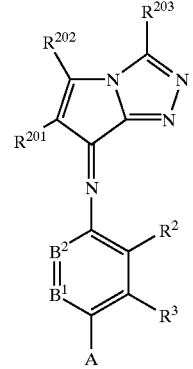

(IV-4)

wherein, A, R², R³, B¹ and B² are synonymous with those of said general formula (I), respectively;

R²⁰¹, R²⁰² and R²⁰³ each independently represents a hydrogen atom, an aliphatic group, an aromatic group, a heterocyclic group, a cyano group, —OR¹¹, —SR¹², —CO₂R¹³, —OCOR¹⁴, —NR¹⁵R¹⁶, —CONR¹⁷R¹⁸, —SO₂R¹⁹, —SO₂NR²⁰R²¹, —NR²²CONR²³R²⁴, —NR²⁵CO₂R²⁶, —COR²⁷, —NR²⁸COR²⁹ or —NR³⁰SO₂R³¹;

R¹¹, R¹², R¹³, R¹⁴, R¹⁵, R¹⁶, R¹⁷, R¹⁸, R¹⁹, R²⁰, R²¹, R²², R²³, R²⁴, R²⁶, R²⁷, R²⁸, R²⁹, R³⁰ and R³¹ each independently represents a hydrogen atom, an aliphatic group or an aromatic group; and R²⁰¹ and R²⁰² may bond each other to form a ring structure.

7. An ink for an ink jet according to claim 3, wherein the oil-soluble dye represented by said general formula (I) is a compound represented by the following formula (IV-1a):

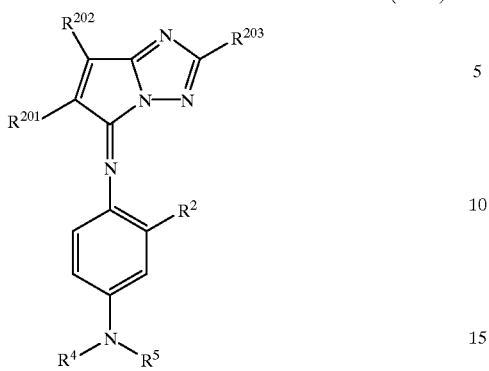 (IV-1a)

wherein, $R^2$ represents a hydrogen atom, alkyl group having 1 to 4 carbon atoms, substituted alkyl group having 1 to 4 carbon atoms, alkoxy group having 1 to 4 carbon atoms, halogen atom, acylamino group having 1 to 5 carbon atoms, aminocarbonylamino group having 1 to 5 carbon atoms or alkoxycarbonylamino group having 2 to 5 carbon atoms;

$R^4$ and $R^5$ each independently represents a hydrogen atom, alkyl group having 1 to 18 carbon atoms or substituted alkyl group having 1 to 18 carbon atoms;

$R^{201}$ and $R^{202}$ each independently represents an electron attractive group having a Hammett substituent constant $\sigma_p$ value of 0.30 or more; and $R^{203}$ represents an alkyl group having 1 to 18 carbon atoms, substituted alkyl group having 1 to 18 carbon atoms, or substituted or unsubstituted aryl group having 6 to 20 carbon atoms.

8. An ink for an ink jet according to claim 1, wherein the oil-soluble dye and the high boiling point organic solvent are emulsified and dispersed in the water-based medium as oil droplets having a fine-particle shape.

9. An ink for an ink jet according to claim 1, wherein content of the compound having in a molecule at least one carbon-carbon unsaturated bond that is different from a phenyl group is from 0.1 to 5 times by weight, relative to the content of the oil-soluble dye.

10. An ink for an ink jet according to claim 1, wherein content of the oil-soluble dye is from 0.05 to 50% by mass with respect to the ink.

11. An ink for an ink jet according to claim 1, wherein total amount of the high boiling point organic solvent is from 0 to 10 times by weight ratio, relative to the amount of the oil-soluble dye.

12. An ink jet recording method, the method comprising recording on an image receiving material having an image receiving layer including white inorganic pigment particles on a support, the method using an ink for an ink jet, with the ink being formed by dispersing in a water-based medium an oil-soluble dye that is dissolved in a high boiling point organic solvent, and the ink containing a compound having in a molecule at least one carbon-carbon unsaturated bond that is different from a phenyl group, wherein the compound having in a molecule at least one carbon-carbon unsaturated bond that is different from a phenyl group is at least one of the compounds represented by the following general formulae (A) to (H):

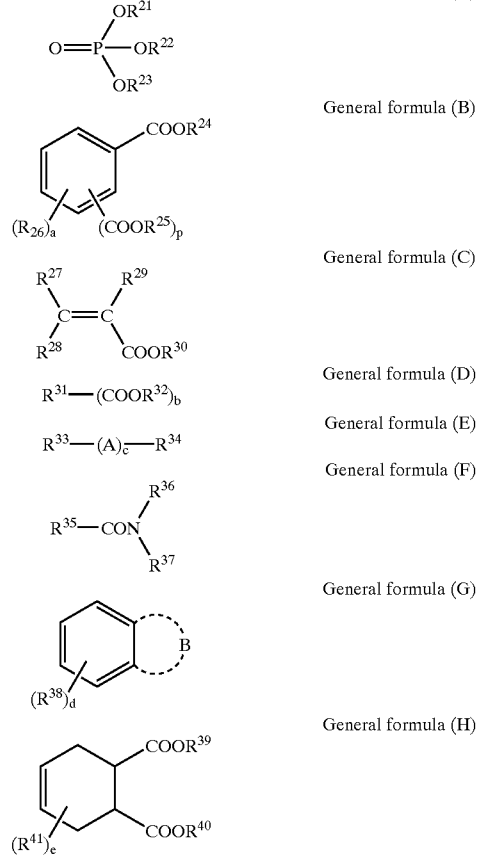

wherein, $R^{21}$, $R^{24}$, $R^{32}$ and $R^{33}$ each independently represents an alkenyl group or an alkynyl group having 2 to 40 carbon atoms;

$R^{22}$, $R^{23}$, $R^{25}$, $R^{27}$, $R^{28}$, $R^{29}$, $R^{30}$, $R^{34}$, $R^{35}$, $R^{36}$, $R^{37}$, $R^{39}$ and $R^{40}$ each independently represents a hydrogen atom, an aliphatic group having 1 to 40 carbon atoms, an aryl group having 6 to 40 carbon atoms, or a heterocyclic group having 1 to 40 carbon atoms;

at least one of $R^{35}$, $R^{36}$ and $R^{37}$ represents an alkenyl group or an alkynyl group having 2 to 40 carbon atoms;

$R^{26}$, $R^{38}$ and $R^{41}$ each represents a substituent;

A represents an oxygen atom or a sulfur atom, and B represents a non-metallic atom group which forms an unsaturated ring;

a represents an integer of 0 to 4, p represents 0 or 1, b represents an integer of 1 to 4, c represents 0 or 1, d represents an integer of 0 to 4, and e represents an integer of 0 to 6;

when b represents 1, $R^{31}$ represents an aliphatic group having 1 to 40 carbon atoms, an aryl group having 6 to 40 carbon atoms, or a heterocyclic group having 1 to 40 carbon atoms; and when b represents an integer of 2 to 4, $R^{31}$ represents an aliphatic group having 1 to 20 carbon atoms each having a valence of b;

when a, b, d and e each represents an integer of 2 or more, a plurality of $R^{26}$, —COOR$^{32}$, $R^{38}$ and $R^{41}$ may be the same or different from each other, respectively; and $R^{21}$ and $R^{22}$, and $R^{21}$ and $R^{23}$ in the general formula (A); $R^{24}$ and $R^{25}$, $R^{24}$ and $R^{26}$, and $R^{26}$ and $R^{26}$ in the general formula (B); $R^{27}$ and $R^{28}$, $R^{27}$ and $R^{29}$, $R^{27}$ and $R^{30}$, and $R^{29}$ and $R^{30}$ in the general formula (C); $R^{31}$ and $R^{32}$, and $R^{32}$ and $R^{32}$ in the general formula (D); $R^{33}$ and $R^{34}$ in the general formula (E); $R^{35}$ and $R^{36}$, and $R^{36}$ and $R^{37}$ in the general formula (F); $R^{38}$ and $R^{38}$, and $R^{38}$ and B in the general formula (G); and $R^{39}$ and $R^{40}$, $R^{40}$ and $R^{41}$, and $R^{41}$ and $R^{41}$ in the general formula (H) may respectively bond each other to form a ring.

13. An ink jet recording method according to claim 12, wherein, in said general formulae (A) to (H), $R^{21}$, $R^{24}$, $R^{32}$ and $R^{33}$ each independently represents an alkenyl group having 2 to 40 carbon atoms; $R^{22}$, $R^{23}$, $R^{25}$, $R^{27}$, $R^{28}$, $R^{29}$, $R^{30}$, $R^{34}$, $R^{35}$, $R^{36}$, $R^{37}$, $R^{39}$ and $R^{40}$ each independently represents a hydrogen atom or an aliphatic group having 1 to 40 carbon atoms; and $R^{26}$, $R^{38}$ and $R^{41}$ each independently represents an aliphatic group having 1 to 30 carbon atoms, an aryl group having 6 to 36 carbon atoms, an alkoxy group having 1 to 30 carbon atoms, a halogen atom, a carbamoyl group having 1 to 30 carbon atoms, an acylamino group having 1 to 30 carbon atoms, an acyloxy group or an aliphatic oxycarbonyl group.

14. An ink jet recording method according to claim 12, wherein said oil-soluble dye is represented by the following general formula (I):

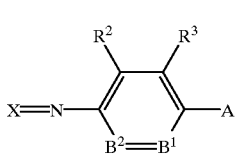

General formula (I)

wherein, X represents a residue of a color photo coupler;

A represents —$NR^4R^5$ or a hydroxy group;

$R^4$ and $R^5$ each independently represents a hydrogen atom, an aliphatic group, an aromatic group or a heterocyclic group;

$B^1$ represents =C($R^6$)— or =N—, and $B^2$ represents —C($R^7$)= or —N=;

$R^2$, $R^3$, $R^6$ and $R^7$ each independently represents a hydrogen atom, a halogen atom, an aliphatic group, an aromatic group, a heterocyclic group, a cyano, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$ or —$NR^{70}SO_2R^{71}$;

$R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group; and $R^2$ and $R^3$, $R^3$ and $R^4$, $R^4$ and $R^5$, $R^5$ and $R^6$, and $R^6$ and $R^7$ may respectively bond each other to form a ring.

15. An ink jet recording method according to claim 14, wherein the oil-soluble dye represented by said general formula (I) is a compound represented by the following general formula (II):

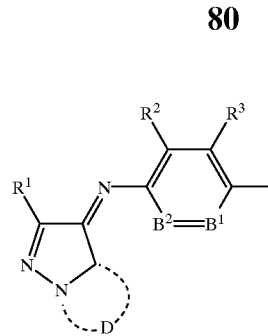

General formula (II)

wherein, $R^2$, $R^3$, A, $B^1$ and $B^2$ are synonymous with those of said general formula (I), respectively;

$R^1$ represents a hydrogen atom, an aliphatic group, an aromatic group, a heterocyclic group, a cyano group, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}CO_2R^{26}$, —$COR^{27}$, —$NR^{28}COR^{29}$ or —$NR^{30}SO_2R^{31}$;

$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group or an aromatic group;

D represents an atom group which forms a five-member or six-member nitrogen containing heterocyclic ring, which may be substituted for at least one of an aliphatic group, an aromatic group, a heterocyclic group, a cyano group, —$OR^{81}$, —$SR^{82}$, —$CO_2R^{83}$, —$OCOR^{84}$, —$NR^{85}R^{86}$, —$CONR^{87}R^{88}$, —$SO_2R^{89}$, —$SO_2NR^{90}R^{91}$, —$NR^{92}CONR^{93}R^{94}$, —$NR^{95}CO_2R^{96}$, —$COR^{97}$, —$NR^{98}COR^{99}$ and —$NR^{100}SO_2R^{101}$;

the heterocyclic ring may further form a condensed ring with another ring; and $R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$ and $R^{101}$ each independently represents a hydrogen atom, an aliphatic group or an aromatic group.

16. An ink jet recording method according to claim 15, wherein the compound represented by said general formula (II) is a compound represented by the following general formula (III):

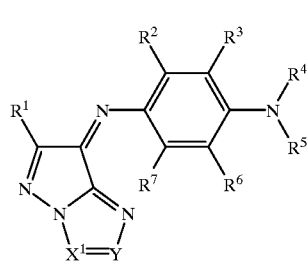

General Formula (III)

wherein, $R^1$, $R^2$, $R^3$, $R^4$, $R^5$, $R^6$ and $R^7$ are synonymous with those of said general formula (II), respectively;

$X^1$ and Y each independently represents —C($R^8$)= or —N=;

$R^8$ represents a hydrogen atom, an aliphatic group or an aromatic group; and one of $X^1$ and Y always represents —N=, and $X^1$ and Y represent —N= at different times each other.

17. An ink jet recording method according to claim 14, wherein the oil-soluble dye represented by said general formula (I) is at least one of the compounds represented by the following formulae (IV-1) to (IV-4):

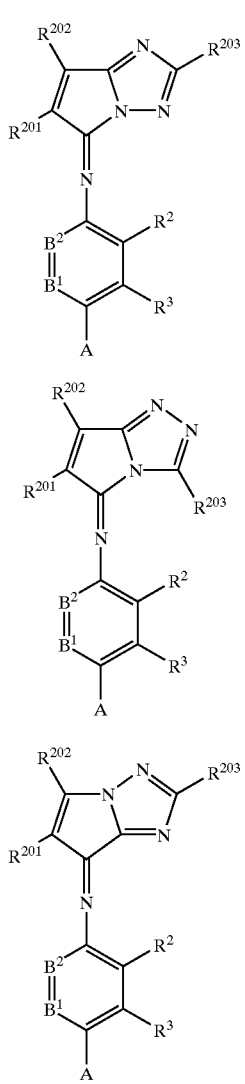

(IV-1)

(IV-2)

(IV-3)

-continued (IV-4)

wherein, A, $R^2$, $R^3$, $B^1$ and $B^2$ are synonymous with those of said general formula (I), respectively;

$R^{201}$, $R^{202}$ and $R^{203}$ each independently represents a hydrogen atom, an aliphatic group, an aromatic group, a heterocyclic group, a cyano group, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}CO_2R^{26}$, —$COR^{27}$, —$NR^{28}COR^{29}$ or —$NR^{30}SO_2R^{31}$;

$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group or an aromatic group; and $R^{201}$ and $R^{202}$ may bond each other to form a ring structure.

* * * * *